US008552105B2

(12) United States Patent
Peters

(10) Patent No.: US 8,552,105 B2
(45) Date of Patent: Oct. 8, 2013

(54) COMPATIBILIZED COMPOSITION, METHOD FOR THE FORMATION THEREOF, AND ARTICLE COMPRISING SAME

(75) Inventor: Edward Norman Peters, Lenox, MA (US)

(73) Assignee: Sabic Innovative Plastics IP B.V. (NL)

( * ) Notice: Subject to any disclaimer, the term of this patent is extended or adjusted under 35 U.S.C. 154(b) by 91 days.

(21) Appl. No.: 13/415,016

(22) Filed: Mar. 8, 2012

(65) Prior Publication Data
US 2013/0237648 A1 Sep. 12, 2013

(51) Int. Cl.
C08L 53/00 (2006.01)
C08F 283/00 (2006.01)

(52) U.S. Cl.
USPC .......................................... 524/505; 525/534

(58) Field of Classification Search
USPC ....................................................... 524/505
See application file for complete search history.

(56) References Cited

U.S. PATENT DOCUMENTS

| 3,306,874 | A | 2/1967 | Hay |
| 3,409,581 | A | 11/1968 | Hagan, Jr. |
| 3,631,126 | A | 12/1971 | Snodgrass et al. |
| 4,853,423 | A | 8/1989 | Walles et al. |
| 4,912,172 | A | 3/1990 | Hallgren et al. |
| 5,108,842 | A | 4/1992 | Hallgren et al. |
| 5,141,791 | A | 8/1992 | Chao et al. |
| 5,916,496 | A | 6/1999 | Weber |
| 6,194,496 | B1 | 2/2001 | Weber et al. |
| 6,770,691 | B2 | 8/2004 | Yeager |
| 7,671,167 | B2 | 3/2010 | Carrillo et al. |
| 2005/0154130 | A1 | 7/2005 | Adedeji et al. |
| 2006/0079642 | A1 | 4/2006 | Adedeji et al. |
| 2006/0135695 | A1 | 6/2006 | Guo et al. |
| 2007/0238831 | A1 | 10/2007 | Klei et al. |
| 2007/0287801 | A1 | 12/2007 | Davis et al. |

FOREIGN PATENT DOCUMENTS

| PL | 164813 B1 | 6/1992 |
| WO | 9532243 | 11/1995 |
| WO | 2009104107 A1 | 8/2009 |

OTHER PUBLICATIONS

Liu et al., Eur. Polym. J., vol. 32, No. 1, pp. 91-99, 1996.*
Co-Pending U.S. Appl. No. 13/169,122, filed Jun. 27, 2011.
Chao et al.; "Poly(2,6-Dimethyl-1,4-Phenylene Ether) (PPE) Redistribution and Its Significance in the Preparation of PPE/Epoxy Laminate"; Reactive Polymers, 15; pp. 9-23; (1991).
Christiansen et al., "The Phase Behavior of Ternary Blends Containing Polycarbonate, Phenoxy, and Polycaprolactone", Journal of Applied Polymer Science, vol. 34, pp. 537-548, 1987.
Coleman et al., "FTi.r. studies of polymer blends containing the poly(hydroxy ether of bisphenol A) and pol(e-caprolactone)", Polymer, vol. 24, pp. 251-256, 1983.
D.E.R. 317 Liquid Epoxy Resin, DOW Product Information Sheet, downloaded from http://msdssearch.dow.com/PublishedLiteratureDOWCOM/dh_01e8/0901b803801e8ef1.pdf?filepath=epoxy/pdfs/noreg/296-01533.pdf&fromPage=GetDoc on Sep. 14, 2011, 3 pages.
D.E.R. 6155 Solid Epoxy Resin, DOW Product Information, downloaded from http://msdssearch.dow.com/PublishedLiteratureDOWCOM/dh_02db/0901b803802db6cb.pdf?filepath=epoxy/pdfs/noreg/296-01592.pdf&fromPage=GetDoc, on Sep. 14, 2011, 3 pages.
D.E.R. 667E Solid Epoxy Resin, DOW Product Information Sheet, downloaded from http://msdssearch.dow.com/PublishedLiteratureDOWCOM/dh_02db/0901b803802db68b.pdf?filepath=epoxy/pdfs/noreg/296-01489.pdf&fromPage=GetDoc on Sep. 14, 2011, 3 pages.
D.E.R. 668-20 Solid Epoxy Resin, DOW Product Information, downloaded from http://msdssearch.dow.com/PublishedLiteratureDOWCOM/dh_02db/0901b803802db6a0.pdf?filepath=epoxy/pdfs/noreg/296-01479.pdf&fromPage=GetDoc on Sep. 14, 2011, 3 pages.
Dekkers et al., Morphology and deformation behaviour of toughened blends of poly(butylene terephthalate), polycarbonate and poly(phenylene ether), Polymer, vol. 32, No. 12, pp. 2150-2153 1991.
DOW Answer Center, "DOW Epoxy—Type Definition", last updated Aug. 13, 2010, 1 page, retrieved from http://dow-answer.custhelp.com/app/answers/detail/a_id/9928/~/dow-epoxy---type-definition on Mar. 7, 2011.
Eguiazabal et al., "Glass transition temperatures in blends of poly(N-vinyl-2-pyrrolidone) with a copolymer of bisphenol A and epichlorohydrin or with poly(vinyl butyral)", Makromol. Chem. 185, pp. 1761-1766, 1984.
EPON Resin 1001F, Technical Data Sheet, Re-issued Sep. 2007, downloaded from http://www.hexion.com/Products/TechnicalDataSheet.aspx?id=4017, on Sep. 14, 2011, 4 pages.
EPON Resin 1002F, Technical Data Sheet, Re-issued Sep. 2007, downloaded from http://www.hexion.com/Products/TechnicalDataSheet.aspx?id=4025 on Sep. 14, 2011, 4 pages.
EPON Resin 1007F, Technical Data Sheet, Re-issued Sep. 2007, downloaded from http://www.hexion.com/Products/TechnicalDataSheet.aspx?id=4029 on Sep. 14, 2011, 4 pages.
Harris et al., "Miscible Binary Blends Containing the Polyhydroxy Ether of Bisphenol-A and Various Aliphatic Polyesters", Journal of Applied Polymer Sciences, vol. 27, 839-855, 1982.
Hobbs et al., "Reactive Processing of Blends of Functionalized Poly(2,6-dimethyl-1,4 phenylene oxide) and Poly (butylene terephthalate", Polymer Preprints, vol. 33, No. 2, pp. 614-615, 1992.
Iribarren, et al.; "Phenoxy Resin: Characterization, Solution Properties, and Inverse Gas Chromatography Investigation of Its Potential Miscibility with Other Polymers"; Journal of Applied Science; 37; pp. 3459-3470; (1989).
Jang et al., "Performance Improvement of Glass-Fiber-Reinforced Polystyrene Composite Using a Surface Modifier. II. Mechanical Properties of Composites", Journal of Applied Polymer Science, vol. 59, pp. 2069-2077, 1996.
Liu et al., "In Situ Compatibilization of PBT/PPO Blends", Eur. Polym. J. vol. 32, No. 1, pp. 91-99, 1996.
Lo et al., "Reactive Compatibilation of PET and PPE Belends of Epoxy Couplers", J. Appl. Polym. Sci. 65, pp. 739-753, 1997.
Peters et al. "Engineering Thermoplastics", Applied Polymer Science, pp. 177-196, 2000.
Peters, "Introduction to Polymer Characterization", Chapter 1—Comprehensive Desk Reference of Polymer Characterization and Analysis, pp. 3-29, 2003.

(Continued)

Primary Examiner — Hui Chin
(74) Attorney, Agent, or Firm — Cantor Colburn LLP

(57) ABSTRACT

A poly(phenylene ether)-poly(hydroxy ether) block copolymer is used to compatibilize blends of polar polymers and non-polar polymers. The resulting compatibilized blends exhibit physical property improvements relative to blends without a compatibilizer and blends with a poly(hydroxy ether).

14 Claims, 3 Drawing Sheets

(56) References Cited

OTHER PUBLICATIONS

Peters, "Polyphenylene Ether (PPE) Blends and Alloys", Chapter 9—Engineering Plastics Handbook, pp. 181-220, 2006.
Peters, "Poly(2,6-dimethyl-1,4-phenylene oxide)", Polymer Data Handbook, 2nd Edition, pp. 534-537, 2009.
PPO* Resin 640, SABIC Data Sheet, downloaded from http://kbam.geampod.com/KBAM/Reflection/Assets/20423.pdf, on Sep. 14, 2011, 1 page.
PPO* Resin SA90, SABIC Data Sheet, downloaded from http://www.sabic-ip.com/gepapp/eng/weather/weatherhtml?sltRegionList=1002002000&sltPrd=1002003013&sltGrd=1002041836&sltUnit=0&sltModule=DATASHEETS&sltVersion=Internet&sltType=Online, on Sep. 14, 2011, 1 page.
PPO* SA90-100, SABIC Data Sheet, downloaded from http://www.sabic-ip.com/resins/DataSheet/Internet/HTML1002002000_1002003013_1002040979_Metric.htm, on Mar. 7, 2011, 2 pages.
Reinking, et al.; "Polyhydroxyethers. I. Effect of Structure on Properties of High Molecular Weight Polymers from Dihydric Phenols and Epichlorodydrin"; Journal of Applied Polymer Science, vol. 7, 1963, pp. 235-2144.
Rejdych et al., "Synthesis and properties of block diepoxides oligo(xylylen oxy)diepoxides", Polymers—Plastic Macromolecular 40, No. 2, 1995, 12 pages, English Translation.
Robeson et al., "Miscible Blends of Poly(butylene terephthalate) and the Polyhydroxyether of Bisphenol A", Journal of Applied Polymer Science, vol. 23, pp. 645-659, 1979.
Robeson, et al.; "Miscibility of the Poly(hydroxy ether) of Bisphenol A with Water-Soluble Polyethers"; Macromolecules 14, 1981, pp. 1644-1650.
Singh et al., "the Miscibility of Polyethersulfone with Phenoxy Resin", Journal of Macromolecular Science—Physics, B25(1&2), pp. 65-87, 1986.
Uriarte, et al., "Miscibility and Phase Separation in Poly(vinyl methylether)/Poly(bisphenol A hydroxy ether) Blends", Macromolecules 20, 1987, pp. 3038-3042.
Yamamoto, "With block *graft copolymer improvement and compatibilization of polymer", J. Jap. Rup. Soc., vol. 62, 14 pages, 1990, Machine Translation.
International Search Report for International Application No. PCT/US2012/069339, International Application Filing Date Dec. 13, 2012; Date of Mailing Apr. 25, 2013, 7 pages.
Written Opinion for International Application No. PCT/US2012/069339, International Application Filing Date Dec. 13, 2012; Date of Mailing Apr. 25, 2013, 4 pages.
International Search Report for International Application No. PCT/US2012/069340, International Application Filing Date Dec. 13, 2012; Date of Mailing Apr. 25, 2013, 7 pages.
Written Opinion for International Application No. PCT/US2012/069340, International Application Filing Date Dec. 13, 2012; Date of Mailing Apr. 25, 2013, 5 pages.
Chiang et al., "Polymer blends of polyamide-6 (PA6) and poly(phenylene ether) (PPE) compatibilized by a multifunctional epoxy coupler", Journal of Polymer Science: Part B: Polymer Physics, 1998, vol. 36, No. 11, pp. 1805-1819, Abstract only, 3 pages.
Lee et al., New Linear Polymers, "Phenoxy Resins" and "Properties of Adhesive Compounds", 1967, McGraw-Hill Inc. Book Company New York, 5 pages.
JP 05-125234 Abstract; Application 03-292613; filed Nov. 8, 1991; "Thermoplastic Resin Composition"; 1 page.
International Search Report and Written Opinion; International Application No. PCT/US2012/040647; International Filing Date Jun. 4, 2012; Date of Mailing Dec. 36, 2012; 8 pages.
U.S. Appl. No. 13/756,692, filed Feb. 1, 2013.
U.S. Appl. No. 13/466,162, filed Apr. 13, 2012.

* cited by examiner

COMPATIBILIZED COMPOSITION, METHOD FOR THE FORMATION THEREOF, AND ARTICLE COMPRISING SAME

BACKGROUND OF THE INVENTION

Poly(hydroxy ether)s (also known as phenoxy resins) form miscible blends with a variety of with polar polymers, such as aliphatic polyesters (see, for example, J. E. Harris, S. H. Goh, D. R. Paul, and J. W. Barlow, *Journal of Applied Polymer Science*, volume 27, page 839 ff. (1982)), aromatic polyesters (see, for example, L. M. Robeson and A. B. Furtek, *Journal of Applied Polymer Science*, volume 23, page 645 ff. (1979); and W. H. Christiansen, D. R. Paul, and J. W. Barlow, *Journal of Applied Polymer Science*, volume 34, page 537 ff. (1987)), polyethers and polyoxides (see, for example, L. M. Robeson, W. F. Hale, and C. N. Merriam, *Macromolecules*, volume 14, page 1644 ff. (1981); and J. I. Iribarren, M. Iriarte, C. Uriarte, J. J. Iruin, *Journal of Applied Polymer Science*, volume 37, page 3459 ff. (1989)), polysulfones (see, for example, V. B. Singh and D. J. Walsh, *Journal of Macromolecular Science., Part B: Phys.*, volume B25, page 65 ff. (1987)), and poly(N-vinyl-2-pyrrolidone)s (see, for example, J. I. Eguiazábal, J. J. Iruin, M. Cortazar, and G. M. Guzman, *Makromolekulare Chemie*, volume 185, page 1761 ff. (1984)). In addition, poly(hydroxy ether)s have shown utility in compatibilizing blends of diverse polar polymers like polyurethanes, polyesters, and nylons (see, for example, C. Uriarte, J. I. Eguiazábal, M. Llanos, J. I. Iribarren, J. J. Iruin, *Macromolecules*, volume 20, pages 3038-3042 (1987); and H. E. Snodgrass, R. L. Lauchlan, U.S. Pat. No. 3,631,126, issued Dec. 28, 1971).

Poly(hydroxy ether)s contain about six percent by weight secondary alcohol groups that can interact with polar functional groups in other polymers and substrates. The existence of such interactions and their influence on the miscibility of polymer blends has been shown by Fourier transform infrared spectroscopy (see, for example, E. J. Moskala and M. M. Coleman, *Polymer Communications*, volume 24, page 206 ff. (1983); and M. M. Coleman and E. J. Moskala, *Polymer*, volume 24, page 251 ff. (1983)). In general, however, poly(hydroxy ether)s are incompatible with non-polar polymers, including aromatic non-polar polymers such as poly(alkenyl aromatic)s, poly(phenylene ether)s, and unhydrogenated and hydrogenated block copolymers of alkenyl aromatic compounds and conjugated dienes.

Epoxy-functionalized monomers and polymers have been used to compatibilize poly(phenylene ether)s with poly(ethylene terephthalate) and poly(butylene terephthalate). See, for example, D.-W Lo, C.-R. Chiang, and F.-C. Chang, *Journal of Applied Polymer Science*, volume 65, pages 739-753 (1997); and W.-B. Liu, W.-F. Kuo, C.-J. Chiang, F.-C. Chang, *European Polymer Journal*, volume 32, pages 91-99 (1996). However, the resulting blends have substantially reduced melt flow compared to corresponding uncompatibilized blends. The reduced melt flow makes the compatibilized blends more difficult to injection mold.

There remains a need for materials capable of compatibilizing blends of polar polymers and non-polar polymers without sacrificing melt flow properties.

BRIEF DESCRIPTION OF THE INVENTION

In copending U.S. patent application Ser. No. 13/169,122, filed 27 Jun. 2011, the synthesis of block copolymers with poly(hydroxy ether) segments and poly(phenylene ether) segments is described. In the present application, these poly(phenylene ether)-poly(hydroxy ether) block copolymers are used to compatibilize blends of polar polymers and non-polar polymers.

One embodiment is a composition comprising: about 30 to about 93 weight percent of a polar polymer selected from the group consisting of cellulose esters, poly(alkyl (meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, poly(vinyl butyral)s, and combinations thereof; about 5 to about 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; and about 2 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein all weight percents are based on the total weight of the composition, unless a different weight basis is specified.

Another embodiment is an injection molded article comprising the composition of the previous paragraph.

Another embodiment is a method of forming a composition, comprising melt blending about 30 to about 93 weight percent of a polar polymer selected from the group consisting of poly(alkyl (meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, and combinations thereof; about 5 to about 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; and about 2 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1 to form the composition; wherein all weight percents are based on the total weight of the composition, unless a different weight basis is specified.

These and other embodiments are described in detail below.

DETAILED DESCRIPTION OF THE INVENTION

Figure 1:
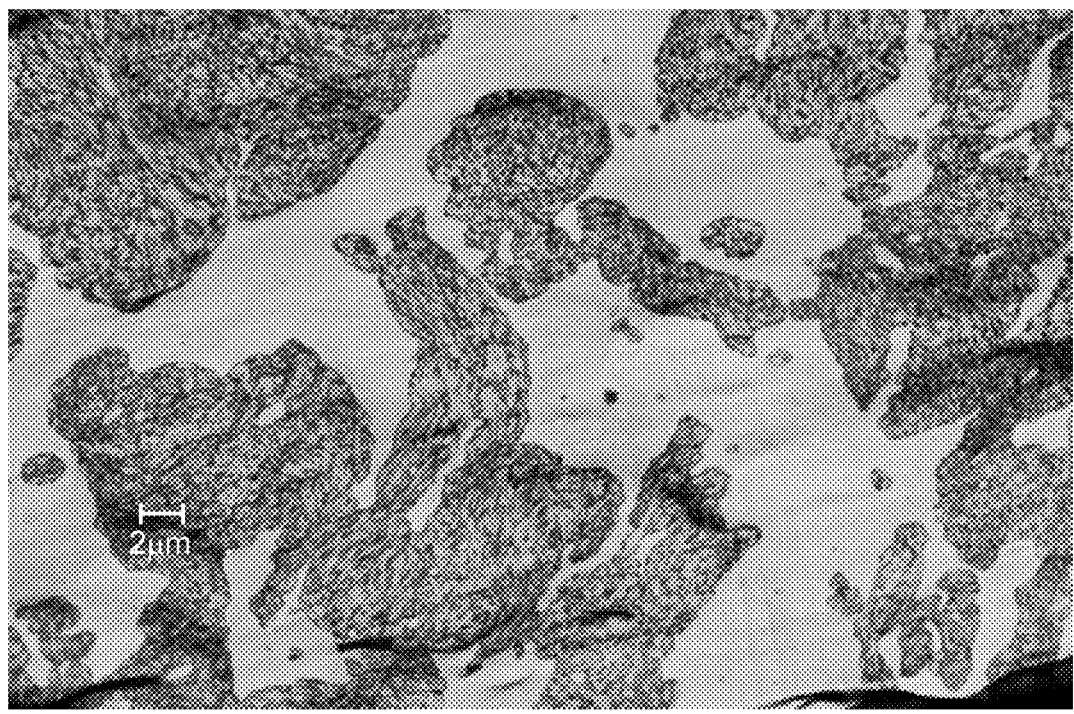
FIG. 1 is a scanning transmission electron micrograph of a stained surface of the Comparative Example B composition exhibiting relatively large disperse phase domains.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

One embodiment is a composition comprising: about 30 to about 93 weight percent of a polar polymer selected from the group consisting of cellulose esters, poly(alkyl (meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, poly(vinyl butyral)s, and combinations thereof; about 5 to about 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; and about 2 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein all weight percents are based on the total weight of the composition, unless a different weight basis is specified.

The polar polymer can be a cellulose ester. Cellulose esters include, for example, cellulose acetate, cellulose propionate, cellulose butyrate, cellulose acetate propionate, cellulose acetate butyrate, cellulose triacetate, and combinations thereof. In some embodiments, the cellulose ester comprises cellulose acetate, cellulose propionate, or a combination thereof. Cellulose esters can be prepared by reaction of cellulose with the corresponding anhydride (e.g., cellulose acetate by reaction of cellulose with acetic anhydride) in the presence of sulfuric acid. Commercially available cellulose esters include cellulose acetates from Celanese and Eastman Chemical, and cellulose acetate butyrate from Eastman Chemical.

The polar polymer can be a poly(alkyl (meth)acrylate). As used herein, the term "(meth)acrylate" encompasses both acrylate and methacrylate. Poly(alkyl (meth)acrylate)s include, for example, poly(methyl acrylate), poly(methyl methacrylate), poly(ethyl acrylate), poly(ethyl methacrylate), poly(n-propyl acrylate), poly(n-propyl methacrylate), poly(iso-propyl acrylate), poly(iso-propyl methacrylate), poly(n-butyl acrylate), poly(n-butyl methacrylate), poly(iso-butyl acrylate), poly(iso-butyl methacrylate), and combinations thereof. In some embodiments, the poly(alkyl (meth)acrylate) comprises poly(methyl methacrylate). Poly(alkyl (meth)acrylate)s can be formed by radical polymerization of the corresponding alkyl (meth)acrylates. Commercially available poly(alkyl (meth)acrylate)s include the poly(methyl methacrylate)s sold by Lucite International under the trade names LUCITE and PERSPEX, and by Altuglas International under the trade name PLEXIGLAS.

The polar polymer can be a polyamide. Polyamides include, for example, polyamide-6, polyamide-6,6, polyamide-4, polyamide-4,6, polyamide-12, polyamide-6,10, polyamide-6,9, polyamide-6,12, amorphous polyamides, polyamide-6/6T, polyamide-6,6/6T, polyamide-9T, and combinations thereof. In some embodiments, the polyamide comprises a polyamide-6. In some embodiments, the polyamide comprises a polyamide-6,6. In some embodiments, the polyamide comprises a polyamide-6 and a polyamide-6,6. Polyamides can be formed by polycondensation of amino acids, or by ring-opening polymerization of lactams. Commercially available polyamides include the polyamide-6 and polyamide-6,6 sold by SABIC Innovative Plastics under the trade names AVP and ESPREE, the polyamide-6 and polyamide-6,6 sold by Asahi Kasei Plastics North America Inc. under the trade name THERYLON, and the polyamide-6 and polyamide-6,6 sold by BASF under the trade name ULTRAMID.

The polar polymer can be a polycarbonate. Polycarbonates have repeating structural carbonate units of the formula

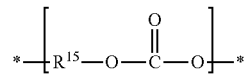

in which at least 60 percent of the total number of $R^{15}$ groups contain aromatic moieties and the balance thereof are aliphatic, alicyclic, or aromatic. In some embodiments, each $R^{15}$ is a $C_{6-30}$ aromatic group, that is, contains at least one aromatic moiety. $R^{15}$ can be derived from a dihydroxy compound such as, for example, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4- hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, catechol, hydroquinone, 2-methylhydroquinone, 2-ethylhydroquinone, 2-propylhydroquinone, 2-butylhydroquinone, 2-t-butylhydroquinone, 2-phenylhydroquinone, 2-cumylhydroquinone, 2,3,5,6-tetramethylhydroquinone, 2,3,5,6-tetra-t-butylhydroquinone, 2,3,5,6-tetrafluorohydroquinone, 2,3,5,6-tetrabromohydroquinone, and combinations thereof. In some embodiments the dihydroxy compound comprises 2,2-bis(4-hydroxyphenyl) propane. Polycarbonates can be formed by reaction of the dihydroxy compound with a carbonate precursor, such as phosgene or a diaryl carbonate (e.g., diphenyl carbonate). Commercially available polycarbonates include those sold by SABIC Innovative Plastics under the trade name LEXAN, those sold by Bayer MaterialScience under the trade name APEC, and those sold by Chemtura under the trade name BLENDEX.

The polar polymer can be a polyester. Polyesters include, for example, poly(ethylene terephthalate), poly(propylene terephthalate), poly(butylene terephthalate), poly(cyclohexanedimethylene terephthalate), poly(ethylene naphthalate), poly(propylene naphthalate), poly(butylene naphthalate), poly(ethylene isophthalate/terephthalate), poly(propylene isophthalate/terephthalate), poly(butylene isophthalate/terephthalate), poly(ethylene terephthalate/naphthalate), poly(propylene terephthalate/naphthalate), poly(butylene terephthalate/naphthalate), polycaprolactone, polylactic acid, and combinations thereof. In some embodiments, the polyester comprises poly(ethylene terephthalate). In some embodiments, the polyester comprises poly(butylene terephthalate). In some embodiments, the polyester comprises polycaprolactone. In some embodiments, the polyester comprises poly(lactic acid). Polyesters can be formed by copolymerization of dialcohols and diacids, by polycondensation of hydroxy acids, or by ring-opening polymerization of lactones. Commercially polyesters include the poly(butylene terephthalate)s sold by SABIC Innovative Plastics under the trade name VALOX, the poly(butylene terephthalate)s sold by DuPont Performance Polymers under the trade name CRASTIN, the poly(ethylene terephthalate)s sold by DuPont Packaging & Industrial Polymers under the trade name MYLAR, the polycaprolactones sold by DURECT under the trade name LACTEL, and the poly(lactic acid)s sold by NatureWorks LLC under the trade name INGEO.

In some embodiments, the polar polymer comprises the polyester, and the polyester is selected from the group consisting of poly(ethylene terephthalate)s, poly(trimethylene terephthalate)s, poly(butylene terephthalate)s, polycaprolactones, poly(lactic acid)s, poly(butylene adipate)s, poly(butylene succinate)s, poly(butylene sebacate)s, and combinations thereof.

The polar polymer can be a polyetherimide. Polyetherimides are polymers having a repeat unit comprising at least one ether group and at least one imide group. Polyetherimides can be formed by the polycondensation reaction of a dianhydride with a diamine. For example, when the dianhydride is 2,2-bis(4-(3,4-dicarboxyphenoxy)phenyl)propane dianhydride and the diamine is meta-phenylenediamine, the polyetherimide-forming reaction can be expressed as

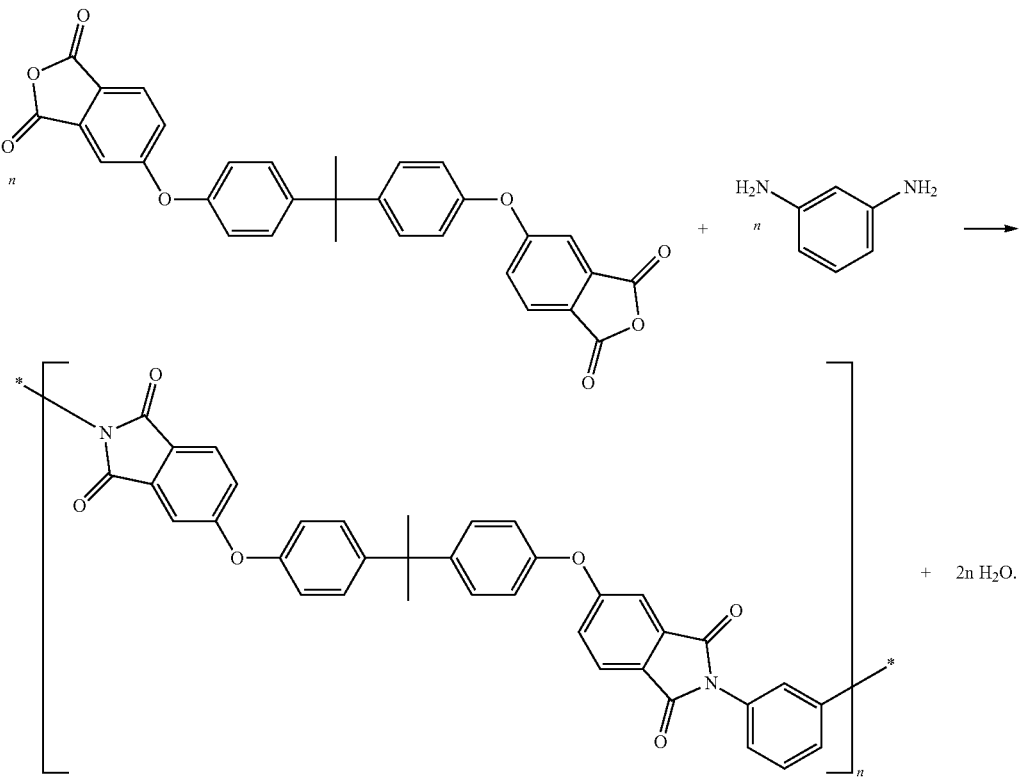

Suitable dianhydrides include, for example, 3,3-bis[4-(3,4-dicarboxyphenoxy)phenyl]propane dianhydride, 4,4'-bis(3,4-dicarboxyphenoxy)diphenyl ether dianhydride, 4,4'-bis(3,4-dicarboxyphenoxy)diphenyl sulfide dianhydride, 4,4'-bis(3,4-dicarboxyphenoxy)benzophenone dianhydride, 4,4'-bis(3,4-dicarboxyphenoxy)diphenyl sulfone dianhydride, 2,2-bis[4-(2,3-dicarboxyphenoxy)phenyl]propane dianhydride, 4,4'-bis(2,3-dicarboxyphenoxy)diphenyl ether dianhydride, 4,4'-bis(2,3-dicarboxyphenoxy)diphenyl sulfide dianhydride, 4,4'-bis(2,3-dicarboxyphenoxy)benzophenone dianhydride, 4,4'-bis(2,3-dicarboxyphenoxy)diphenyl sulfone dianhydride, 4-(2,3-dicarboxyphenoxy)-4'-(3,4-dicarboxyphenoxy)diphenyl-2,2-propane dianhydride, 4-(2,3-dicarboxyphenoxy)-4'-(3,4-dicarboxyphenoxy)diphenyl ether dianhydride, 4-(2,3-dicarboxyphenoxy)-4'-(3,4-dicarboxyphenoxy)diphenyl sulfide dianhydride, 4-(2,3-dicarboxyphenoxy)-4'-(3,4-dicarboxyphenoxy)benzophenone dianhydride, 4-(2,3-dicarboxyphenoxy)-4'-(3,4-dicarboxyphenoxy)diphenyl sulfone dianhydride, and combinations thereof. Suitable diamines include, for example, ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(p-amino-t-butyl)toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl)sulfide, bis-(4-aminophenyl)sulfone, bis(4-aminophenyl)ether, and combinations thereof. In some embodiments, the dianhydride comprises 2,2-bis(4-(3,4-dicarboxyphenoxy)phenyl)propane dianhydride and the diamine comprises meta-phenylenediamine. In some embodiments, the polyetherimide comprises poly(2,2'-bis(4-(3,4-dicarboxyphenoxy)phenyl-propane)-1,3-phenylene bisimide) (CAS Reg. No. 61128-46-9). Commercially available polyetherimides include, for example, those from SABIC Innovative Plastics under the trade names EXTEM and ULTEM, those from Saint Gobain Performance Plastics under the trade name MELDIN, and those from PolyOne Corporation under the trade name EDGETEK.

The polar polymer can be a polysulfone. Polysulfones can be formed by the reaction of a dihydroxy compound with a bis(halophenyl)sulfone in the presence of base. For example, when the dihydroxy compound is bisphenol A (2,2-bis(4-hydroxyphenyl)propane), the bis(halophenyl)sulfone is 4,4'-dichlorodiphenylsulfone, and the base is sodium carbonate, the polysulfone-forming reaction can be expressed as

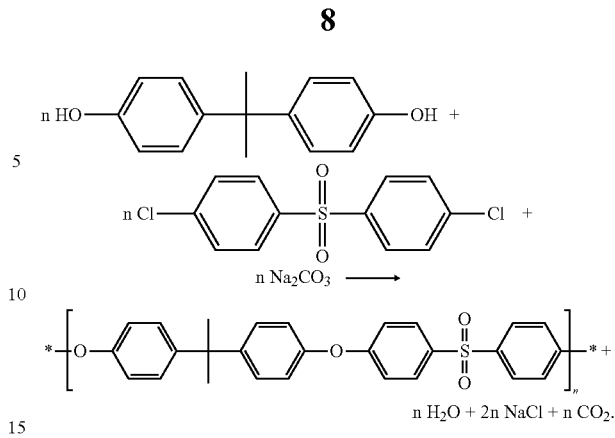

Suitable dihydroxy compounds include those described above in the context of the polycarbonates, as well as 1,4-dihydroxybenzene, 1,3-dihydroxybenzene, 4,4'-biphenol, 3,3'-biphenol, 3,4'-biphenol, and combinations thereof. Suitable bis(halophenyl)sulfones include 4,4'-difluorodiphenylsulfone, 4,4'-dichlorodiphenylsulfone, 4,4'-dibromodiphenylsulfone, 3,4'-difluorodiphenylsulfone, 3,4'-dichlorodiphenylsulfone, 3,4'-dibromodiphenylsulfone, 3,3'-difluorodiphenylsulfone, 3,3'-dichlorodiphenylsulfone, 3,3'-dibromodiphenylsulfone, and combinations thereof. In some embodiments, the dihydroxy compound is bisphenol A (2,2-bis(4-hydroxyphenyl)propane), and the bis(halophenyl)sulfone is 4,4'-dichlorodiphenylsulfone. In some embodiments, the dihydroxy compound is 4,4'-sulfonyldiphenol, and the bis(halophenyl)sulfone is 4,4'-dichlorodiphenylsulfone. Commercially available polysulfones include, for example, those from SABIC Innovative Plastics under the trade name LNP THERMOCOMP, those from BASF under the trade name ULTRASON, and those from Sumitomo under the trade names SUMIKAEXCEL and SUMIPLOY.

The polar polymer can be a polyethersulfone. Polyethersulfones are polymers having repeating units of the structure

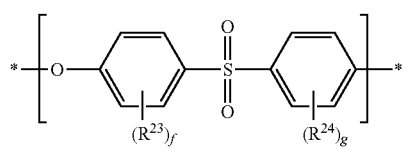

wherein f and g are each independently 0-4, and each occurrence of $R^{23}$ and $R^{24}$ is independently halogen or $C_1$-$C_6$ alkyl. In some embodiments, the polyethersulfone comprises repeating units of the structure

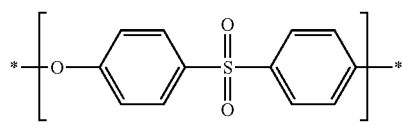

Polyethersulfones can be prepared by the reaction of a bis(hydroxyphenyl)sulfone the with a bis(halophenyl)sulfone in the presence of base. Commercially available polyethersulfones include, for example, those from Port Plastics under the trade name UDEL.

The polar polymer can be a poly(ethylene-ethyl acrylate). Poly(ethylene-ethyl acrylate) (CAS Reg. No. 9010-86-0) is a random copolymer of ethylene and ethyl acrylate. In some embodiments, the ethylene content of the poly(ethylene-ethyl acrylate) is about 70 to about 98 weight percent, specifically about 80 to about 95 weight percent, with the balance being ethyl acrylate content. Poly(ethylene-ethyl acrylate) can be prepared by radical copolymerization of ethylene and ethyl acrylate. Commercially available poly(ethylene-ethyl acrylate)s include those from Dow under the trade name AMPLIFY, from Arkema under the trade name LOTADER, and from DuPont under the trade name ELVALOY.

The polar polymer can be a poly(ethylene-vinyl acetate). Poly(ethylene-vinyl acetate) (CAS Reg. No. 24937-78-8) is a random copolymer of ethylene and vinyl acetate. In some embodiments, the vinyl acetate content of the poly(ethylene-vinyl acetate) is about 8 to about 60 weight percent, specifically about 10 to about 50 weight percent, more specifically about 15 to about 40 weight percent, still more specifically about 20 to about 30, with the balance being ethylene content. Poly(ethylene-vinyl acetate) can be prepared by radical copolymerization of ethylene and vinyl acetate. Commercially available poly(ethylene-vinyl acetate)s include those from DuPont under the trade name ELVAX, from Arkema under the trade name EVATANE, and from LyondellBasell under the trade name ULTRATHENE.

The polar polymer can be a polyurethane, also known as thermoplastic polyurethane. Polyurethanes are formed by the reaction of a diisocyanate with a long chain diol (sometimes referred to as a "polyol"). For example, when the diisocyanate is diphenylmethane-4,4'-diisocyanate and the long chain diol is polyethylene glycol, the polyurethane-forming reaction can be expressed as

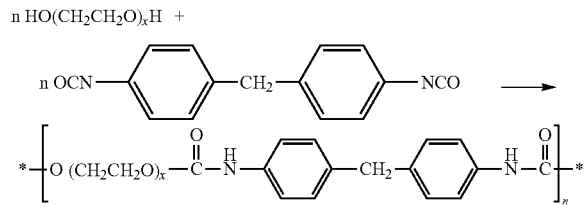

Suitable diisocyanates include, for example, 1,2-phenylene diisocyanate, 1,3-phenylene diisocyanate, 1,4-phenylene diisocyanate, 1,4-naphthalene diisocyanate, 1,5-naphthalene diisocyanate, 4,4'-diphenyl ether diisocyanate, 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, isophorone diisocyanate, and combinations thereof. Long chain diols most commonly fall into three classes: polyether diols, polyester diols, and polybutadiene diols. Polyether diols include, for example, polyethylene glycols, polypropylene glycols, polybutylene glycols, ethylene oxide-capped poly(oxypropylene)diols and polyols, alkoxylated bisphenols (such as ethoxylated bisphenol A and propoxylated bisphenol A), and combinations thereof. Polyester diols, which can be prepared by diol-initiated polymerization of a lactone, include, for example, polycaprolactone diols, poly(ethylene adipate)diols, poly(propylene adipate)diols, poly(butylene adipate)diols, orthophthalic polyester polyols, terephthalic polyester polyols, and combinations thereof. Polybutadiene diols are linear polybutadienes with a hydroxy group at each end. In some embodiments, the long chain diol has a number average molecular weight of about 500 to about 10,000 atomic mass units, specifically about 1,000 to about 5,000 atomic mass units. In addition to the diisocyanate and the long chain diol, the reactants used to form the polyurethane can further include a short chain diol sometimes referred to as a chain extender. Suitable short chain diols include, for example, ethylene glycol, propylene glycol, diethylene glycol, 1,4-butanediol, and combinations thereof. Commercially available polyurethanes include those from Huntsman under the trade name IROGRAN, from Bayer Material Science under the trade names DESMOPAN and TEXIN, from Lubrizol under the trade name PELLETHANE, and from Great Eastern Resins Industrial Co., Ltd. under the trade name ISOTHANE, and from BASF under the trade name ELASTOLLAN.

The polar polymer can be a poly(vinyl acetate). Poly(vinyl acetate) (CAS Reg. No. 9003-20-7) is a homopolymer of vinyl acetate. Poly(ethylene-vinyl acetate) can be prepared by radical polymerization of vinyl acetate. Commercially available poly(vinyl acetate)s include those from ACHEMA, from Wacker under the trade name VINNAPAS, and from Solutia under the trade name GELVA.

The polar polymer can be a poly(vinyl alcohol). Poly(vinyl alcohol) (CAS Reg. No. 9002-89-5) is a homopolymer of vinyl alcohol. Poly(vinyl alcohol) can be prepared by radical polymerization of vinyl alcohol, which exists largely in its tautomeric form, acetaldehyde. Commercially available poly(vinyl alcohol)s include those from Denka under the trade name POVAL, from MonoSol LLC under the trade name MONOSOL, and from Sekisui Chemical Company, Ltd. under the trade name CELVOL.

The polar polymer can be a poly(styrene-acrylonitrile). Poly(styrene-acrylonitrile) (CAS Reg. No. 9003-54-7) is a random copolymer of styrene and acrylonitrile. In some embodiments, the styrene content of the poly(styrene-acrylonitrile) is about 60 to about 90 weight percent, specifically about 70 to about 80 weight percent, with the balance being acrylonitrile content. Poly(styrene-acrylonitrile) can be prepared by radical copolymerization of styrene and acrylonitrile. Commercially available poly(styrene-acrylonitrile)s include those from Chemtura under the trade name BLENDEX, from Ferro under the trade name STYVEX, and from SABIC Innovative Plastics under the trade names ESPREE, LNP LUBRICOMP, and LNP THERMOCOMP.

The polar polymer can be a poly(styrene-maleic anhydride). Poly(styrene-maleic anhydride) (CAS Reg. No. 9011-13-6) is a random copolymer of styrene and maleic anhydride. In some embodiments, the styrene content of the poly(styrene-maleic anhydride) is about 3 to about 25 weight percent, specifically about 5 to about 15 weight percent, with the balance being maleic anhydride content. Poly(styrene-maleic anhydride) can be prepared by radical copolymerization of styrene and maleic anhydride. Commercially available poly(styrene-maleic anhydride)s include those from INEOS ABS under the trade name LUSTRAN, and from Polyscope Polymers BV under the trade name XIRAN.

The polar polymer can be a poly(vinyl butyral). Poly(vinyl butyral) (CAS Reg. No. 9001-13-6). Poly(vinyl butyral) is prepared by reaction of poly(vinyl alcohol) with butyraldehyde. Commercially available poly(vinyl butyral)s include those available from DuPont under the trade name BUTACITE, from Solutia under the trade name SAFLEX, and from Kuraray under the trade name TROSIFOL.

There is no particular limit on the molecular weight or melt viscosity of the polar polymer. A skilled person can select a polar polymer molecular weight or melt viscosity based on factors including the desired use (e.g., molding conditions), and intermolecular interactions of the polar polymer with itself.

The polar polymer can be used in an amount of about 30 to about 93 weight percent, based on the weight of the composition. Within this range, the polar polymer amount can be about 40 to about 86 weight percent, specifically about 45 to about 74 weight percent, more specifically about 50 to about 64 weight percent, even more specifically about 50 to about 54 weight percent.

In addition to the polar polymer, the composition comprises a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof.

The non-polar polymer can be an unhydrogenated block copolymer of an alkenyl aromatic compound and a conjugated diene. For brevity, this component is referred to as an "unhydrogenated block copolymer". The unhydrogenated block copolymer can comprise about 10 to about 90 weight percent of poly(alkenyl aromatic) content and about 90 to about 10 weight percent of poly(conjugated diene) content, based on the weight of the unhydrogenated block copolymer. In some embodiments, the unhydrogenated block copolymer is a low poly(alkenyl aromatic content) unhydrogenated block copolymer in which the poly(alkenyl aromatic) content is about 10 to less than 40 weight percent, specifically about 20 to about 35 weight percent, more specifically about 25 to about 35 weight percent, yet more specifically about 30 to about 35 weight percent, all based on the weight of the low poly(alkenyl aromatic) content unhydrogenated block copolymer. In other embodiments, the unhydrogenated block copolymer is a high poly(alkenyl aromatic) content unhydrogenated block copolymer in which the poly(alkenyl aromatic) content is 40 to about 90 weight percent, specifically about 50 to about 80 weight percent, more specifically about 60 to about 70 weight percent, all based on the weight of the high poly(alkenyl aromatic) content unhydrogenated block copolymer.

In some embodiments, the unhydrogenated block copolymer has a weight average molecular weight of about 40,000 to about 400,000 atomic mass units. The number average molecular weight and the weight average molecular weight can be determined by gel permeation chromatography and based on comparison to polystyrene standards. In some embodiments, the unhydrogenated block copolymer has a weight average molecular weight of about 200,000 to about 400,000 atomic mass units, specifically about 220,000 to about 350,000 atomic mass units. In other embodiments, the unhydrogenated block copolymer has a weight average molecular weight of about 40,000 to about 200,000 atomic mass units, specifically about 40,000 to about 180,000 atomic mass units, more specifically about 40,000 to about 150,000 atomic mass units.

The alkenyl aromatic monomer used to prepare the unhydrogenated block copolymer can have the structure

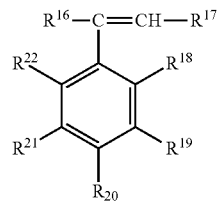

wherein $R^{16}$ and $R^{17}$ each independently represent a hydrogen atom, a $C_1$-$C_8$ alkyl group, or a $C_2$-$C_8$ alkenyl group; $R^{18}$ and $R^{22}$ each independently represent a hydrogen atom, a $C_1$-$C_8$ alkyl group, a chlorine atom, or a bromine atom; and $R^{19}$, $R^{20}$, and $R^{21}$ each independently represent a hydrogen atom, a $C_1$-$C_8$ alkyl group, or a $C_2$-$C_8$ alkenyl group, or $R^{19}$ and $R^{20}$ are taken together with the central aromatic ring to form a naphthyl group, or $R^{20}$ and $R^{21}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the unhydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and combinations thereof. In some embodiments, the conjugated diene is 1,3-butadiene, 2-methyl-1,3-butadiene, or a combination thereof. In some embodiments, the conjugated diene consists of 1,3-butadiene.

The unhydrogenated block copolymer is a copolymer comprising (A) at least one block derived from an alkenyl aromatic compound and (B) at least one block derived from a conjugated diene. The arrangement of blocks (A) and (B) includes a linear structure, a grafted structure, and a radial teleblock structure with or without a branched chain. Linear block copolymers include tapered linear structures and non-tapered linear structures. In some embodiments, the unhydrogenated block copolymer has a tapered linear structure. In some embodiments, the unhydrogenated block copolymer has a non-tapered linear structure. In some embodiments, the unhydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the unhydrogenated block copolymer is a diblock copolymer, a triblock copolymer, or a combination thereof.

In some embodiments, the unhydrogenated block copolymer excludes the residue of monomers other than the alkenyl aromatic compound and the conjugated diene. In some embodiments, the unhydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

In some embodiments, the unhydrogenated block copolymer includes the residue of one or more acid functionalizing agents, such as maleic anhydride.

In some embodiments, the unhydrogenated block copolymer comprises a polystyrene-polybutadiene-polystyrene triblock copolymer. In some embodiments, the unhydrogenated block copolymer comprises a polystyrene-polyisoprene-polystyrene triblock copolymer.

Methods for preparing unhydrogenated block copolymers are known in the art and unhydrogenated block copolymers are commercially available. Illustrative commercially available unhydrogenated block copolymers include the polystyrene-polybutadiene-polystyrene triblock copolymers from Kraton Performance Polymers Inc. under the trade names D1101 and D1102; and the styrene-butadiene radial teleblock copolymers from Chevron Phillips Chemical Company under the trade names K-RESIN KR01, KR03, and KR-05.

The non-polar polymer can be a hydrogenated block copolymer of an alkenyl aromatic compound and a conjugated diene. For brevity, this component is referred to as a "hydrogenated block copolymer". The hydrogenated block copolymer is the same as the unhydrogenated block copolymer, except that in the hydrogenated block copolymer the aliphatic unsaturated group content in the block (B) derived from a conjugated diene is at least partially reduced by hydrogenation. In some embodiments, the aliphatic unsaturation in the (B) block is reduced by at least 50 percent, specifically at least 70 percent, more specifically at least 90 percent.

Illustrative commercially available hydrogenated block copolymers include the polystyrene-poly(ethylene-propylene) diblock copolymers available from Kraton Performance Polymers Inc. as KRATON G1701 and G1702; the polystyrene-poly(ethylene-butylene)-polystyrene triblock copolymers available from Kraton Performance Polymers Inc. as KRATON G1641, G1650, G1651, G1654, G1657, G1726, G4609, G4610, GRP-6598, MD-6932M, MD-6933, and MD-6939; the polystyrene-poly(ethylene-propylene)-polystyrene triblock copolymers available from Kraton Performance Polymers Inc. as KRATON G1730; the maleic anhydride-grafted polystyrene-poly(ethylene-butylene)-polystyrene triblock copolymers available from Kraton Performance Polymers Inc. as KRATON G1901, G1924, and MD-6684; the maleic anhydride-grafted polystyrene-poly(ethylene-butylene-styrene)-polystyrene triblock copolymer available from Kraton Performance Polymers Inc. as KRATON MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-poly(ethylene-butylene)-polystyrene triblock copolymer comprising 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising 65 weight percent polystyrene available from Kuraray as SEPTON S2104.

The non-polar polymer can be a poly(alkenyl aromatic). As used herein, the term "poly(alkenyl aromatic)" refers to a homopolymer of an alkenyl aromatic monomer, a copolymer of two or more alkenyl aromatic monomers, a rubber-modified derivative of one of the foregoing polymers, or a combination thereof. The alkenyl aromatic monomer is described above in the context of the unhydrogenated block copolymer. Representative poly(alkenyl aromatic)s include atactic polystyrenes, syndiotactic polystyrenes, isotactic polystyrenes, and rubber-modified polystyrenes. In some embodiments, the poly(alkenyl aromatic) comprises an atactic polystyrene. In some embodiments, the poly(alkenyl aromatic) comprises a rubber-modified polystyrene comprising 80 to 96 weight percent polystyrene content, specifically 88 to 94 weight percent polystyrene content; and 4 to 20 weight percent polybutadiene content, specifically 6 to 12 weight percent polybutadiene content, based on the weight of the rubber-modified polystyrene. In some embodiments, the poly(alkenyl aromatic) comprises an atactic polystyrene and a rubber-modified polystyrene. Commercially available poly(alkenyl aromatic)s include the atactic polystyrenes available as EA3130-AMST from Americas Styrenics LLC and as ESPREE CPS15GP from SABIC Innovative Plastics; the syndiotactic polystyrene available as EDTEK QT-30GF/000 Natural from PolyOne Corporation; and the rubber-modified polystyrenes available as EB6400-AMST from Americas Styrenics LLC and as HIPS3190 from SABIC Innovative Plastics.

The non-polar polymer can be a poly(phenylene ether). Suitable poly(phenylene ether)s include those comprising repeating structural units having the formula

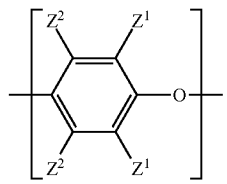

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) has an intrinsic viscosity of about 0.25 to about 1 deciliter per gram measured at 25° C. in chloroform. Within this range, the poly(phenylene ether) intrinsic viscosity can be about 0.3 to about 0.65 deciliter per gram, more specifically about 0.35 to about 0.5 deciliter per gram, even more specifically about 0.4 to about 0.5 deciliter per gram.

In some embodiments, the poly(phenylene ether) is essentially free of incorporated diphenoquinone residues. In the context, "essentially free" means that the fewer than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues). For example, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it may be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in International Patent Application Publication No. WO2009/104107 A1 of Delsman et al. In an alternative approach utilizing the temperature-dependent solubility of diphenoquinone in toluene, a toluene solution containing diphenoquinone and poly(phenylene ether) can be adjusted to a temperature of about 25° C., at which diphenoquinone is poorly soluble but the poly(phenylene ether) is soluble, and the insoluble diphenoquinone can be removed by solid-liquid separation (e.g., filtration).

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether). In some embodiments, the poly(phenylene ether) comprises a poly(2,6-dimethyl-1,4-phenylene ether) having an intrinsic viscosity of about 0.35 to about 0.5 deciliter per gram, specifically about 0.35 to about 0.46 deciliter per gram, measured at 25° C. in chloroform.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer.

The poly(phenylene ether) can be prepared by oxidative polymerization of one or more monohydric phenols. Commercially available poly(phenylene ether)s include those from Asahi Kasei Chemicals Corporation under the trade name XYRON, and from SABIC Innovative Plastics under the trade name PPO.

The composition comprises the non-polar polymer in an amount of about 5 to about 68 weight percent, based on the weight of the composition. Within this range, the non-polar polymer amount can be about 10 to about 65 weight percent, specifically about 20 to about 60 weight percent, more specifically about 30 to about 55 weight percent, even more specifically about 40 to about 50 weight percent.

In some embodiments, the non-polar polymer comprises the poly(phenylene ether) and the poly(alkenyl aromatic), wherein the poly(alkenyl aromatic) is selected from the group consisting of polystyrenes, rubber-modified polystyrenes, and combinations thereof.

In some embodiments, the non-polar polymer comprises the poly(phenylene ether) and the hydrogenated block copolymer.

In some embodiments, the polar polymer comprises the polyester, wherein the polyester comprises a poly(butylene terephthalate); and the non-polar polymer comprises the poly(phenylene ether) and the hydrogenated block copolymer.

In some embodiments, the polar polymer comprises the polyester, wherein the polyester comprises a poly(lactic acid); and the non-polar polymer comprises the poly(phenylene ether) and the hydrogenated block copolymer.

In some embodiments, the polar polymer comprises the poly(ethylene-vinyl acetate); and the non-polar polymer comprises (a) the poly(phenylene ether), and (b) the unhydrogenated block copolymer, the hydrogenated block copolymer, or the combination thereof.

In addition to the polar polymer and the non-polar polymer, the composition comprises a poly(phenylene ether)-poly(hydroxy ether) block copolymer. The poly(phenylene ether)-poly(hydroxy ether) block copolymer comprises at least one poly(hydroxy ether) block, and at least one poly(phenylene ether) block, and the mole ratio of poly(hydroxy ether) blocks to poly(phenylene ether) blocks is 0.95:1 to 1.00:1.

The poly(phenylene ether) block is derived from a telechelic poly(phenylene ether) having terminal phenolic hydroxy groups. A "phenolic hydroxyl group" is a hydroxyl group bonded to a substituted or unsubstituted benzene ring. The term "telechelic" is used to describe a linear polymer in which the two terminal end groups of the polymer chain have the same functionality. In some embodiments, the poly(phenylene ether) block has the structure

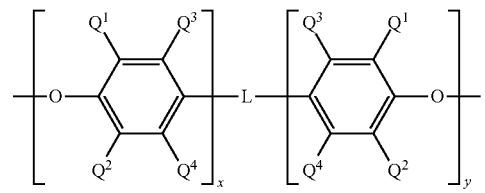

wherein $Q^1$ and $Q^2$ are identical within each phenylene ether unit and selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30, specifically 0 to about 20, more specifically 0 to about 15, still more specifically 0 to about 10, even more specifically 0 to about 8, with the proviso that the sum of x and y is at least 2, specifically at least 3, more specifically at least 4; and L has the structure

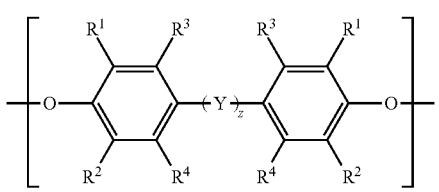

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

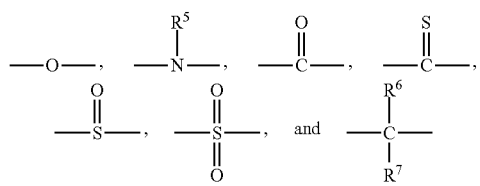

wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group. In some embodiments, $Q^1$ is a di-n-butylaminomethyl group formed by reaction of a terminal 3,5-dimethyl-1,4-phenyl group with the di-n-butylamine component of an oxidative polymerization catalyst. In some embodiments, each occurrence of $Q^1$ and $Q^2$ is methyl, each occurrence of $Q^3$ is hydrogen, each occurrence of $Q^4$ is hydrogen or methyl, the sum of x and y is 2 to about 15, each occurrence of $R^1$ and $R^2$ and $R^3$ and $R^4$ is independently hydrogen or methyl, and Y has the structure

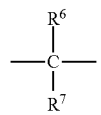

wherein each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group.

In the above structures, there are limitations on the variables x and y, which correspond to the number of phenylene ether repeating units at two different places in the bifunctional poly(phenylene ether) molecule. In the structure, x and y are independently 0 to about 30, specifically 0 to about 20, more specifically 0 to about 15, even more specifically 0 to about 10, yet more specifically 0 to about 8. The sum of x and y is at least 2, specifically at least 3, more specifically at least 4. A particular polyfunctional poly(phenylene ether) resin can be analyzed by proton nuclear magnetic resonance spectroscopy ($^1$H-NMR) to determine whether these limitations are met for the entire resin, on average. Specifically, $^1$H-NMR can distinguish between resonances for protons associated with internal and terminal phenylene ether groups, and internal and terminal residues of a polyhydric phenol, as well as other terminal residues. It is therefore possible to determine the average number of phenylene ether repeat units per molecule, and the relative abundance of internal and terminal residues derived from dihydric phenol.

In some embodiments, the at least one poly(phenylene ether) block has the structure

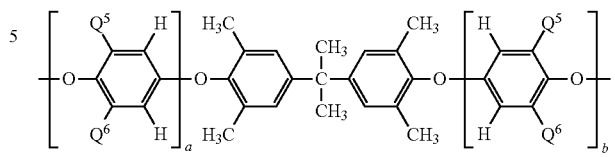

wherein each occurrence of $Q^5$ and $Q^6$ is independently methyl, di-n-butylaminomethyl, or morpholinomethyl; and each occurrence of a and b is independently 0 to about 20, with the proviso that the sum of a and b is at least 2, specifically at least 3, and more specifically at least 4.

The at least one poly(hydroxy ether) block has the structure

-B-[A-B]$_n$- wherein A is a hydrocarbyl residue of valence 2, and B is a residue of structure

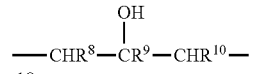

wherein $R^8$ to $R^{10}$ are each independently hydrogen, or $C_1$-$C_{12}$ hydrocarbyl; and n is about 1 to about 60.

In some embodiments, A is a residue having the structure

—O-[G$^1$]$_t$-[E]$_s$-[G$^1$]$_u$-O— wherein each $G^1$ is independently at each occurrence a $C_6$-$C_{20}$ aromatic radical, and E is independently at each occurrence a direct bond, or a structure selected from

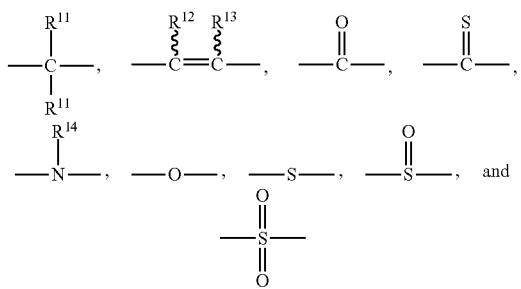

wherein each occurrence of $R^{11}$-$R^{14}$ is independently hydrogen or $C_1$-$C_{12}$ hydrocarbyl, s is 0 or 1, and t and u are each independently 1 to 10; and B is a residue of structure

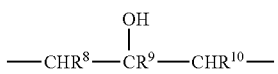

wherein $R^8$ to $R^{10}$ are each independently hydrogen, or $C_1$-$C_{12}$ hydrocarbyl; and n is about 1 to about 60.

In some embodiments, the at least one poly(hydroxyl ether) block has the structure

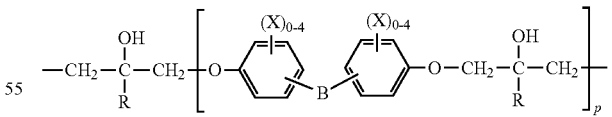

wherein each occurrence of R is independently hydrogen or methyl; each occurrence of X is independently hydrogen, chloro, fluoro, bromo, $C_1$-$C_{18}$ hydrocarbyl optionally further comprising a member or members selected from carboxy, carboxamide, ketone, aldehyde, alcohol, halogen, and nitrile; each occurrence of B is independently a carbon-carbon single bond, $C_1$-$C_{18}$ hydrocarbyl, $C_1$-$C_{12}$ hydrocarbyloxy, $C_1$-$C_{12}$ hydrocarbylthio, carbonyl, sulfide, sulfonyl, sulfinyl, phosphoryl, silane, or such groups further comprising a member or members selected from carboxyalkyl, carboxamide, ketone, aldehyde, alcohol, halogen, and nitrile; and p is independently 1 to about 20.

In some embodiments, the at least one poly(hydroxyl ether) block has the structure

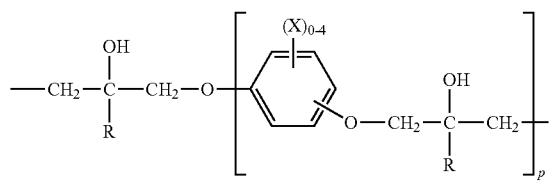

wherein R, X, and p are as defined above.

In some embodiments, the at least one poly(hydroxy ether) block has the structure

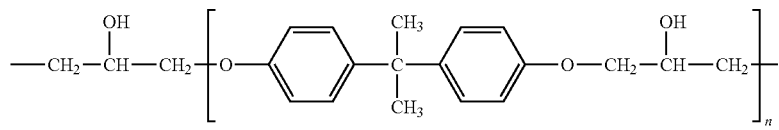

wherein n is about 1 to about 60, specifically about 1 to about 40, more specifically about 1 to about 20.

In some embodiments, the at least one poly(phenylene ether) block has the structure

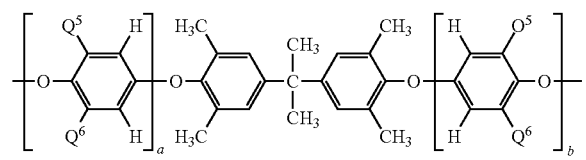

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and the at least one poly(hydroxy ether) block has the structure

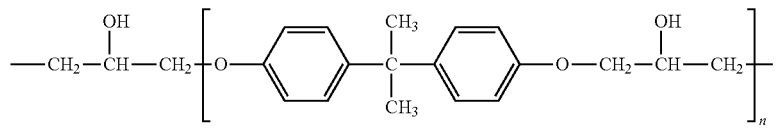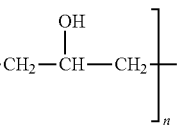

wherein n is about 1 to about 60.

In some embodiments, residue A of the poly(hydroxyl ether) block is derived from a dihydroxy aromatic compound. Suitable dihydroxy aromatic compounds include resorcinol, catechol, hydroquinone, 1,5-dihydroxynaphthalene, 2,6-dihydroxynaphthalene, 2,7-dihydroxynapthalene, 2-(diphenylphosphoryl)hydroquinone, bis(2,6-dimethylphenol) 2,2'-biphenol, 4,4-biphenol, 2,2',6,6'-tetramethylbiphenol, 2,2',3,3',6,6'-hexamethylbiphenol, 3,3',5,5'-tetrabromo-2,2'6,6'-tetramethylbiphenol, 3,3'-dibromo-2,2',6,6'-tetramethylbiphenol, 2,2',6,6'-tetramethyl-3,3'5'-dibromobiphenol, 4,4'-isopropylidenediphenol (bisphenol A), 4,4'-isopropylidenebis(2,6-dibromophenol) (tetrabromobisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'-(1,3-phenylenediisopropylidene)bisphenol(bisphenol M), 4,4'-isopropylidenebis(3-phenylphenol), 4,4'-(1,4-phenylenediisoproylidene)bisphenol(bisphenol P), 4,4'-ethylidenediphenol (bisphenol E), 4,4'-oxydiphenol, 4,4'-thiodiphenol, 4,4'-thiobis(2,6-dimethylphenol), 4,4'-sulfonyldiphenol, 4,4'-sulfonylbis(2,6-dimethylphenol) 4,4'-sulfinyldiphenol, 4,4'-hexafluoroisoproylidene)bisphenol (Bisphenol AF), 4,4'-(1-phenylethylidene)bisphenol(Bisphenol AP), bis(4-hydroxyphenyl)-2,2-dichloroethylene (Bisphenol C), bis(4-hydroxyphenyl)methane (Bisphenol-F), bis(2,6-dimethyl-4-hydroxyphenyl)methane, 4,4'-(cyclopentylidene)diphenol, 4,4'-(cyclohexylidene)diphenol (Bisphenol Z), 4,4'-(cyclododecylidene)diphenol 4,4'-(bicyclo[2.2.1]heptylidene)diphenol, 4,4'-(9H-fluorene-9,9-diyl)diphenol, 3,3-bis(4-hydroxyphenyl)isobenzofuran-1(3H)-one, 1-(4-hydroxyphenyl)-3,3-dimethyl-2,3-dihydro-1H-inden-5-ol, 1-(4-hydroxy-3,5-dimethylphenyl)-1,3,3,4,6-pentamethyl-2,3-dihydro-1H-inden-5-ol, 3,3,3',3'-tetramethyl-2,2',3,3'-tetrahydro-1,1'-spirobi[indene]-5,6'-diol(spirobiindane), dihydroxybenzophenone (bisphenol K), tris(4-hydroxyphenyl)methane, tris(4-hydroxyphenyl)ethane, tris(4-hydroxyphenyl)propane, tris(4-hydroxyphenyl)butane, tris(3-methyl-4-hydroxyphenyl)methane, tris(3,5-dimethyl-4-hydroxyphenyl)methane, tetrakis(4-hydroxyphenyl)ethane, tetrakis(3,5-dimethyl-4-hydroxyphenyl)ethane, bis(4-hydroxyphenyl) phenylphosphine oxide, dicyclopentadienylbis(2,6-dimethyl phenol), dicyclopentadienyl bis(2-methylphenol), dicyclopentadienyl bisphenol, 4,4'-dihydroxy-alpha-methylstilbene, and the like.

In some embodiments, residue A is derived from a dihydroxy aromatic compound selected from the group consisting of 2,2-bis(4-hydroxyphenyl)propane (bisphenol A), 2,2-bis (3,5-dichloro-4-hydroxyphenyl)propane (tetrachloro bisphenol A), 2,2-bis(3,5-dibromo-4-hydroxyphenyl)propane (tetrabromo bisphenol A), bis(4-hydroxyphenyl)methane (bisphenol F), 1,1-bis(4-hydroxyphenyl)ethane (bisphenol ACP), bis(4-hydroxyphenyl)sulfone (bisphenol S),2,2-bis(4-hydroxycyclohexyl)propane (hydrogenated bisphenol A), 1,5-dihydroxynapthalene, 2,2',6,6'-tetramethyl-4,4'-dihydroxybiphenyl, and combinations thereof. A specific dihydroxy aromatic compound is 2,2-bis(4-hydroxyphenyl)propane (bisphenol A).

In some embodiments, residue A of the poly(hydroxyl ether) block is derived from a dihydroxy compound selected from the group consisting of 1,4-butanediol, 1,6-hexanediol, neopentylglycol, 2,2-bis(4-hydroxy-cyclohexyl)propane, polyethylene glycol, polypropylene glycol, or the like.

In some embodiments, residue B is derived from an epihalohydrin selected from the group consisting of epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and combinations thereof. A specific epihalohydrin is epichlorohydrin.

In some embodiments, the mole ratio of poly(hydroxyl ether) blocks to poly(phenylene ether) blocks is 0.95:1 to 1.00:1. The lower limit of the mole ratio of poly(hydroxyl ether) blocks to poly(phenylene ether) blocks can also be 0.96:1, specifically 0.97:1, more specifically 0.98:1, and still more specifically 0.99:1. The upper limit of the mole ratio of poly(hydroxyl ether) blocks to poly(phenylene ether) blocks can also be 0.99:1, specifically 0.98:1, more specifically 0.97:1, and still more specifically 0.96:1. By maintaining the mole ratio of poly(hydroxyl ether) blocks to poly(phenylene ether) blocks in these ranges, the molecular weight of the block copolymer is maximized, and epoxy end groups are substantially avoided. Thus, the poly(phenylene ether)-poly(hydroxy ether) block copolymer has melt stability. It is important to note that the mole ratio of poly(hydroxyl ether) blocks to poly(phenylene ether) blocks cannot be even slightly greater than 1.00:1. Thus, Comparative Example 1, with a mole ratio of 1.001:1, and Comparative Example 2, with a mole ratio of 1.002:1, are outside the scope of these embodiments.

In some embodiments, the poly(phenylene ether)-poly(hydroxy ether) block copolymer comprises the at least one poly(hydroxyl ether block) in an amount of about 1 to about 99 weight percent, specifically about 10 to about 90 weight percent, more specifically about 20 to about 80 weight percent, still more specifically about 30 to about 70 weight percent, and even more specifically about 40 to about 60 weight percent, based on the weight of the poly(phenylene ether)-poly(hydroxy ether) block copolymer; and the poly(phenylene ether)-poly(hydroxy ether) block copolymer comprises the at least one poly(phenylene ether) block in an amount of about 1 to about 99 weight percent, specifically about 10 to about 90 weight percent, more specifically about 20 to about 80 weight percent, still more specifically about 30 to about 70 weight percent, and even more specifically about 40 to about 60 weight percent, based on the weight of the poly(phenylene ether)-poly(hydroxy ether) block copolymer.

In some embodiments, the number average molecular weight of the poly(phenylene ether)-poly(hydroxy ether) block copolymer as measured by gel permeation chromatography (GPC) against polystyrene standards is about 5,000 to about 50,000 atomic mass units, specifically about 5,500 to about 30,000 atomic mass units, more specifically about 5,000 to about 30,000 atomic mass units, still more specifically about 5,500 to about 20,000 atomic mass units, and even more specifically, about 5,500 to about 10,000 atomic mass units.

In some embodiments, the amount of terminal epoxy groups (i.e., the weight percent of terminal glycidyl groups) in the poly(phenylene ether)-poly(hydroxy ether) block copolymer is less than about 0.09 weight percent, specifically less than about 0.05 weight percent, more specifically less than about 0.025 weight percent, still more specifically less than about 0.01 weight percent, and even more specifically less than about 0.005 weight percent, all based on the weight of the poly(phenylene ether)-poly(hydroxy ether) block copolymer. The amount of terminal epoxy groups can be measured by proton nuclear magnetic resonance ($^1$H-NMR) spectroscopy as set forth in the working examples. When the terminal epoxy group content is less than about 0.09 weight percent, the poly(phenylene ether)-poly(hydroxy ether) block copolymer has thermal stability and is suitable for thermal forming processes such as extruding, calendering, injection molding, and blow molding.

The poly(phenylene ether)-poly(hydroxy ether) block copolymer can be prepared by a method comprising reacting a telechelic poly(phenylene ether) having terminal hydroxyl groups with a telechelic poly(hydroxy ether) epoxy resin having terminal epoxy groups, wherein the mole ratio of the telechelic poly(hydroxy ether) to the telechelic poly(phenylene ether) is 0.95:1 to 1.00:1. The reaction can be conducted in the presence of a solvent selected from aromatic hydrocarbons, chlorinated hydrocarbons, and polar aprotic solvents. Suitable polar aprotic solvents include ketones, esters, ethers, amides, nitriles, sulfoxides, sulfones, and mixtures thereof. In some embodiments, the solvent is cyclohexanone. One embodiment is a poly(phenylene ether)-poly(hydroxy ether) block copolymer prepared by such a method.

The reaction can be conducted in the presence of tertiary amine catalyst that is non-volatile under the reaction conditions. Examples of suitable tertiary amine catalysts are triethylamine, tri-n-propylamine, tri-n-butylamine, dimethylaniline, diethylaniline, alpha-methylbenzyldimethylamine, N,N-dimethylaminoethanol, N,N-dimethylaminopyridine (DMAP), alkylimidazoles, and the like, and mixtures thereof A specific tertiary amine catalyst is N,N-dimethylaminopyridine (DMAP).

In some embodiments, the telechelic poly(hydroxyl ether) epoxy resin is added to the telechelic poly(phenylene ether) so that there is always an excess of phenolic groups over epoxy groups in the reaction mixture. The epoxy resin can be added in portions over about 15 to about 300 minutes, specifically about 30 to about 270 minutes, more specifically about 45 to about 240 minutes, still more specifically about 60 to about 210 minutes, and even more specifically about 90 to about 180 minutes. After addition of the epoxy resin to the poly(phenylene ether) is complete, the mixture can be stirred for about 1 to about 12 hours at the reaction temperature. The reaction can be conducted at a temperature of about 100 to about 200° C., specifically, about 120 to about 180° C., more specifically, about 130 to about 170° C., and still more specifically, about 140 to about 160° C.

Upon completion of the reaction, the reaction mixture can be cooled and diluted with a co-solvent selected from aromatic hydrocarbons, chlorinated hydrocarbons, and polar aprotic solvents. In some embodiments, the co-solvent is 2-butanone. After dilution of the reaction mixture with the co-solvent, an anti-solvent is added to effect precipitation of the poly(phenylene ether)-poly(hydroxy ether) block copolymer. The co-solvent can be an alcohol. Suitable alcohols include methanol and isopropanol. After precipitation, the product can be filtered, washed with anti-solvent, and dried under vacuum to afford the poly(phenylene ether)-poly(hydroxy ether) block copolymer.

The poly(phenylene ether)-poly(hydroxy ether) block copolymer has advantageous physical properties which makes it useful as a component of a molding composition. These physical properties are improved over phenoxy resins. The poly(phenylene ether)-poly(hydroxy ether) block copolymer has a density of about 1.1 to about 1.2 grams per cubic centimeter, as measured at 23° C. according to ASTM D792-08, compared to a density of 1.1774 grams per cubic centimeter for phenoxy resin; a glass transition temperature ($T_g$) of about 100 to about 170° C. as measured by differential scanning calorimetry according to ASTM D3418-08, compared to a $T_g$ of 90° C. for phenoxy resin; a heat distortion temperature (HDT) of about 90 to about 140° C. as measured according to ASTM D648-07, Method B at a load of 1.82 megapascals, compared to a HDT of 77° C. for phenoxy resin; a flexural modulus of about 2900 to about 3300 megapascals as measured according to ASTM D790-10, Method A, at 23°

C. and a speed of 6.4 millimeters per minute, compared to a flexural modulus of 2761 megapascals for phenoxy resin.

As set forth above, the poly(phenylene ether)-poly(hydroxy ether) block copolymer has a mole ratio of poly(hydroxy ether) blocks to poly(phenylene ether) blocks is 0.95:1 to 1.00:1. This results in a poly(phenylene ether)-poly(hydroxy ether) block copolymer having less than about 0.09 weight percent of terminal epoxy groups. This is a particularly advantageous feature because the poly(phenylene ether)-poly(hydroxy ether) block copolymer has good melt stability. The poly(phenylene ether)-poly(hydroxy ether) block copolymer can be melt-blended or melt-kneaded, and articles can be formed from the composition by extruding, calendering, or molding. This is in marked contrast to poly(phenylene ether)-poly(hydroxy ether) block copolymers having greater than 0.09 weight percent terminal epoxy groups. These block copolymers are subject to cross-linking reactions between the terminal epoxy groups and hydroxyl groups of the poly(phenylene ether)-poly(hydroxy ether) block copolymer in the melt. Thus they are thermoset, not thermoplastic, materials. Therefore, poly(phenylene ether)-poly(hydroxy ether) block copolymers having greater than 0.09 weight percent terminal epoxy groups cannot be melt-blended or melt-kneaded, and articles cannot be formed from poly(phenylene ether)-poly(hydroxy ether) block copolymers having greater than 0.09 weight percent terminal epoxy groups by extruding, calendering, or injection molding. Examples of articles that can be formed from compositions comprising the poly(phenylene ether)-poly(hydroxy ether) block copolymer as a compatibilizer for polar and non-polar polymers include electrical connectors, small appliance and power tool housings, and automotive parts. Conditions for extruding, calendering, or injection molding conditions will depend on the selection of the polar polymer type and the non-polar polymer type and can be determined by a skilled person.

One embodiment is a method of forming a composition, comprising melt blending about 30 to about 93 weight percent of a polar polymer selected from the group consisting of poly(alkyl (meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, and combinations thereof; about 5 to about 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; and about 2 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1 to form the composition; wherein all weight percents are based on the total weight of the composition, unless a different weight basis is specified. Within the range of about 30 to about 93 weight percent, the polar polymer amount can be about 40 to about 86 weight percent, specifically about 45 to about 74 weight percent, more specifically about 50 to about 64 weight percent, even more specifically about 50 to about 54 weight percent. Within the range of about 5 to about 68 weight percent, the non-polar polymer amount can be about 10 to about 65 weight percent, specifically about 20 to about 60 weight percent, more specifically about 30 to about 55 weight percent, even more specifically about 40 to about 50 weight percent. Within the range of about 2 to about 20 weight percent, the poly(phenylene ether)-poly(hydroxy ether) block copolymer amount can be about 4 to about 15 weight percent, specifically about 6 to about 12 weight percent. The melt-blending or melt-kneading can be performed using common equipment such as ribbon blenders, Henschel mixers, Banbury mixers, drum tumblers, single-screw extruders, twin-screw extruders, multi-screw extruders, co-kneaders, and the like. The melt blending temperature will depend on the identities of the polar polymer and non-polar polymer and can be determined by a skilled person. Illustrative melt blending conditions are described in the working examples below.

The invention includes at least the following embodiments.

Embodiment 1: A composition comprising: about 30 to about 93 weight percent of a polar polymer selected from the group consisting of cellulose esters, poly(alkyl (meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, poly(vinyl butyral)s, and combinations thereof; about 5 to about 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; and about 2 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1; wherein all weight percents are based on the total weight of the composition, unless a different weight basis is specified.

Embodiment 2: The composition of embodiment 1, wherein the poly(phenylene ether)-poly(hydroxy ether) block copolymer has a number average molecular weight of about 5,000 to about 50,000 atomic mass units.

Embodiment 3: The composition of embodiment 1 or 2, wherein the at least one poly(phenylene ether) block has the structure

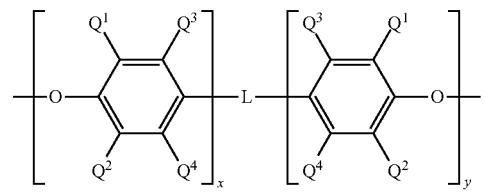

wherein $Q^1$ and $Q^2$ are selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30, with the proviso that the sum of x and y is at least 2; and L has the structure

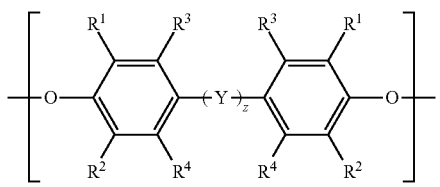

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

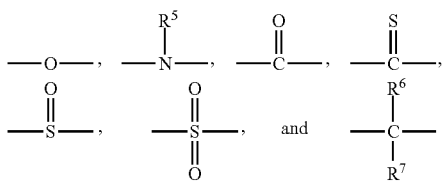

wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group; and wherein the at least one poly(hydroxy ether) block has the structure -B-[A-B]$_n$- wherein A is a residue of structure

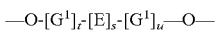

wherein each $G^1$ is independently at each occurrence a $C_6$-$C_{20}$ aromatic radical, and E is independently at each occurrence a direct bond, or a structure selected from the group consisting of

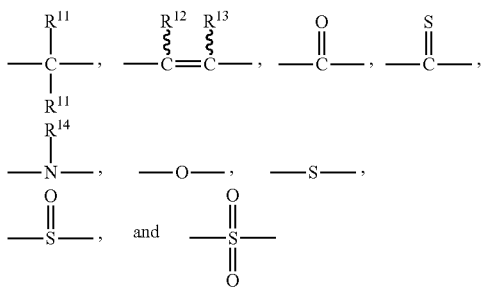

wherein each occurrence of $R^{11}$-$R^{14}$ is independently hydrogen or $C_1$-$C_{12}$ hydrocarbyl, s is 0 or 1, and t and u are each independently 1 to 10; and wherein B is a residue of structure

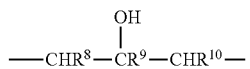

wherein $R^8$ to $R^{10}$ are each independently hydrogen, or $C_1$-$C_{12}$ hydrocarbyl; and wherein n is about 1 to about 60.

Embodiment 4: The composition of any of embodiments 1-3, wherein the at least one poly(phenylene ether) block has the structure

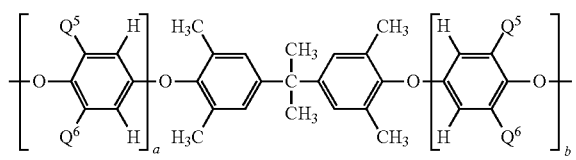

wherein each occurrence of $Q^5$ and $Q^6$ is independently methyl, di-n-butylaminomethyl, or morpholinomethyl; and each occurrence of a and b is independently 0 to about 20, provided that the sum of a and b is at least 2; and wherein the at least one poly(hydroxy ether) block has the structure

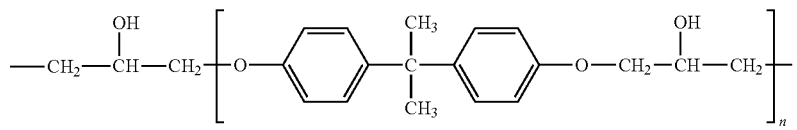

wherein n is about 1 to about 60.

Embodiment 5: The composition of any of embodiments 1-4, wherein the non-polar polymer comprises the poly(phenylene ether).

Embodiment 6: The composition of any of embodiments 1-5, wherein the non-polar polymer comprises the poly(phenylene ether) and the poly(alkenyl aromatic); and wherein the poly(alkenyl aromatic) is selected from the group consisting of polystyrenes, rubber-modified polystyrenes, and combinations thereof.

Embodiment 7: The composition of any of embodiments 1-5, wherein the non-polar polymer comprises the poly(phenylene ether) and the hydrogenated block copolymer.

Embodiment 8: The composition of any of embodiments 1-7, wherein the polar polymer comprises the polyester; and wherein the polyester is selected from the group consisting of poly(ethylene terephthalate)s, poly(trimethylene terephthalate)s, poly(butylene terephthalate)s, polycaprolactones, poly(lactic acid)s, poly(butylene adipate)s, poly(butylene succinate)s, poly(butylene sebacate)s, and combinations thereof.

Embodiment 9: The composition of any of embodiments 1-6, wherein the polar polymer comprises the polyester; wherein the polyester comprises a poly(butylene terephthalate); and wherein the non-polar polymer comprises the poly(phenylene ether) and the hydrogenated block copolymer.

Embodiment 10: The composition of any of embodiment 1-6, wherein the polar polymer comprises the polyester; wherein the polyester comprises a poly(lactic acid); and wherein the non-polar polymer comprises the poly(phenylene ether) and the hydrogenated block copolymer.

Embodiment 11: The composition of any of embodiments 1-6, wherein the polar polymer comprises the poly(ethylene-vinyl acetate); and wherein the non-polar polymer comprises the poly(phenylene ether), and the unhydrogenated block copolymer, the hydrogenated block copolymer, or the combination thereof.

Embodiment 12: The composition of embodiment 11, wherein the poly(ethylene-vinyl acetate) comprises about 8 to about 60 weight percent vinyl acetate residue.

Embodiment 13: An injection molded article comprising the composition of any of embodiments 1-12.

Embodiment 14: A method of forming a composition, comprising: melt blending about 30 to about 93 weight percent of a polar polymer selected from the group consisting of poly(alkyl (meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, and combinations thereof; about 5 to about 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; and about 2 to about 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1 to form the composition; wherein all weight percents are based on the total weight of the composition, unless a different weight basis is specified.

The invention is further illustrated by the following non-limiting examples.

PREPARATIVE EXAMPLES

Individual components used in the preparative examples are summarized in Table 1.

TABLE 1

| Component | Description |
|---|---|
| PPE-2OH 0.06 IV | Copolymer of 2,6-dimethylphenol and 2,2-bis(3,5-dimethyl-4-hydroxyphenyl)propane, CAS Reg. No. 1012321-47-9, having an average of about 1.9 hydroxyl groups per molecule, an intrinsic viscosity of 0.06 deciliter per gram measured in chloroform at 25° C., and a hydroxyl equivalent weight of about 630 grams per equivalent, prepared according to the procedure of Example 4 in U.S. Pat. No. 7,671,167 B2 to Carrillo et al. |
| PPE-2OH 0.09 IV | Copolymer of 2,6-dimethylphenol and 2,2-bis(3,5-dimethyl-4-hydroxyphenyl)propane, CAS Reg. No. 1012321-47-9, having an average of about 1.9 hydroxyl groups per molecule, a hydroxyl equivalent weight of about 780 grams per equivalent, and an intrinsic viscosity of about 0.09 deciliter per gram as measured at 25° C. in chloroform; obtained as SA90 from SABIC Innovative Plastics. |
| PPE-2OH 0.12 IV | Copolymer of 2,6-dimethylphenol and 2,2-bis(3,5-dimethyl-4-hydroxyphenyl)propane, CAS Reg. No. 1012321-47-9, having an average of about 1.9 hydroxyl groups per molecule, an intrinsic viscosity of 0.12 deciliter per gram measured in chloroform at 25° C., and a hydroxyl equivalent weight of 1700 grams per equivalent, prepared according to the procedure of Example 1 in U.S. Pat. No. 7,671,167 B2 to Carrillo et al. |
| DER 317 | 2,2-Bis(4-hydroxyphenyl)propane-epichlorohydrin polymer, a high viscosity liquid epoxy resin having an epoxide equivalent weight of 199.3 grams per equivalent; obtained as DER 317 from Dow Chemical. |
| DER 667-E | 2,2-Bis(4-hydroxyphenyl)propane-epichlorohydrin polymer, a high molecular weight Type 7 solid epoxy resin having an epoxide equivalent weight of 1744 grams per equivalent; obtained as DER 667-E from Dow Chemical. |
| DER 668-20 | 2,2-Bis(4-hydroxyphenyl)propane-epichlorohydrin polymer, a high molecular weight Type 8 solid epoxy resin having an epoxide equivalent weight of 2500 grams per equivalent; obtained as DER 668-20 from Dow Chemical. |
| DER 6155 | 2,2-Bis(4-hydroxyphenyl)propane-epichlorohydrin polymer, a high molecular weight Type 5 solid epoxy resin having an epoxide equivalent weight of 1365 grams per equivalent obtained as DER 6155 from Dow Chemical. |
| EPON 1001F | 2,2-Bis(4-hydroxyphenyl)propane-epichlorohydrin polymer, a solid epoxy resin having an epoxide equivalent weight of 528 grams per equivalent obtained as EPON 1001F from Momentive Specialty Chemicals. |
| EPON 1002F | 2,2-Bis(4-hydroxyphenyl)propane-epichlorohydrin polymer, a solid epoxy resin having an epoxide equivalent weight of 663 grams per equivalent; obtained as EPON 1002F from Momentive Specialty Chemicals. |
| EPON 1004F | 2,2-Bis(4-hydroxyphenyl)propane-epichlorohydrin polymer, a solid epoxy resin having an epoxide equivalent weight of 853 grams per equivalent; obtained as EPON 1004F from Momentive Specialty Chemicals. |
| EPON 1007F | 2,2-Bis(4-hydroxyphenyl)propane-epichlorohydrin polymer, a solid epoxy resin having an epoxide equivalent weight of 1810 grams per equivalent obtained as EPON 1007F from Momentive Specialty Chemicals. |

Poly(phenylene ether)-poly(hydroxy ether) block copolymers were prepared by the reaction of hydroxy-bifunctional poly(phenylene ether) with 2,2-bis(4-hydroxyphenyl)propane-epichlorohydrin polymers. The procedures are described below.

Preparative Example 1

Poly(Phenylene Ether)-Poly(Hydroxy Ether) Block Copolymer with 24 Weight Percent Poly(Phenylene Ether) Blocks

TABLE 2

Reactant Amounts

| Reactant | HEW[1] (grams/equivalent) | EEW[2] (grams/equivalent) | Amount (grams) | Amount equivalents |
|---|---|---|---|---|
| PPE-2OH 0.09 IV | 778 | — | 118.67 | 0.15253 |
| DER 668-20 | — | 2500 | 381.33 | 0.15253 |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of N,N-dimethylaminopyridine (DMAP) was added and dissolved. The DER 668-20 polymer was added in portions over 90 minutes as follows.

| Time (minutes) | Amount Added (weight %) |
|---|---|
| 0 | 73 |
| 30 | 23 |
| 60 | 3.5 |
| 90 | 0.5 |

The solution was stirred for 7 hours at 150° C. The reaction mixture was cooled below 80° C. and diluted with 400 milliliters 2-butanone. The resultant poly(phenylene ether)-poly (hydroxy ether) block copolymer was isolated by precipitation in methanol, filtered, washed with methanol, and dried in a vacuum oven at 100° C. The yield was 465 grams (93%).

Preparative Example 2

Poly(Phenylene Ether)-Poly(Hydroxy Ether) Block Copolymer with 30 Weight Percent Poly(Phenylene Ether) Blocks

TABLE 3

Reactant Amounts

| Reactant | HEW[1] (grams/equiv) | EEW[2] (grams/equiv) | Amount (grams) | Amount (equiv) | Ratio Epoxy to PPE |
|---|---|---|---|---|---|
| PPE-2OH 0.09 IV | 778 | — | 150.31 | 0.1932 | 1.000:1 |
| EPON 1007F | — | 1810 | 349.69 | 0.1932 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The EPON 1007F polymer was added in portions over 90 minutes as follows.

| Time (minutes) | Amount Added (weight %) |
|---|---|
| 0 | 63 |
| 30 | 32 |
| 60 | 4 |
| 90 | 1 |

The solution was stirred for 7 hours at 150° C. The reaction mixture was cooled below 80° C. and diluted with 400 milliliters 2-butanone. The resultant poly(phenylene ether)-poly (hydroxy ether) block copolymer was isolated by precipitation in methanol, filtered, washed with methanol, and dried in a vacuum oven at 100° C. The yield was 462 grams (92.4%).

Preparative Example 3

Poly(Phenylene Ether)-Poly(Hydroxy Ether) Block Copolymer with 36 Weight Percent Poly(Phenylene Ether) Blocks

TABLE 4

Reactant Amounts

| Reactant | HEW[1] (grams/equiv) | EEW[2] (grams/equiv) | Amount (grams) | Amount (equiv) | Ratio Epoxy to PPE |
|---|---|---|---|---|---|
| PPE-2OH 0.09 IV | 778 | — | 181.52 | 0.2333 | 1.000:1 |
| DER 6155 | — | 1365 | 318.47 | 0.2333 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The DER 6155 polymer was added in portions over 90 minutes as follows.

| Time (minutes) | Amount Added (weight %) |
|---|---|
| 0 | 63 |
| 30 | 31 |
| 60 | 5 |
| 90 | 1 |

The solution was stirred for 7 hours at 150° C. The reaction mixture was cooled below 80° C. and diluted with 400 milliliters 2-butanone. The resultant poly(phenylene ether)-poly (hydroxy ether) block copolymer was isolated by precipitation in methanol, filtered, washed with methanol, and dried in a vacuum oven at 100° C. The yield was 455 grams (91%).

Preparative Example 4

Poly(Phenylene Ether)-Poly(Hydroxy Ether) Block Copolymer with 54 Weight Percent Poly(Phenylene Ether) Blocks

TABLE 5

| | Reactant Amounts | | | | |
|---|---|---|---|---|---|
| Reactant | HEW[1] (grams/equiv) | EEW[2] (grams/equiv) | Amount (grams) | Amount (equiv) | Ratio Epoxy to PPE |
| PPE-2OH 0.09 IV | 778 | — | 269.99 | 0.3470 | 0.9997:1 |
| EPON 1002F | — | 663 | 230.03 | 0.3469 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The EPON 1002F polymer was added in portions over 90 minutes as follows.

| Time (minutes) | Amount Added (Weight %) |
|---|---|
| 0 | 70 |
| 30 | 25 |
| 60 | 4 |
| 90 | 1 |

The solution was stirred for 7 hours at 150° C. The reaction mixture was cooled below 80° C. and diluted with 400 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 460 grams (92%).

Preparative Example 5

Poly(Phenylene Ether)-Poly(Hydroxy Ether) Block Copolymer with 60 Weight Percent Poly(Phenylene Ether) Blocks

TABLE 6

| | Reactant Amounts | | | | |
|---|---|---|---|---|---|
| Reactant | HEW[1] (grams/ equiv) | EEW[2] (grams/ equiv) | Amount (grams) | Amount (equiv) | Ratio Epoxy to PPE |
| PPE-2OH 0.09 IV | 778 | — | 297.86 | 0.3829 | 1.000:1 |
| EPON 1001F | — | 528 | 202.14 | 0.3829 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The EPON 1001F polymer was added in portions over 90 minutes as follows.

| Time (minutes) | Amount Added (Weight %) |
|---|---|
| 0 | 62 |
| 30 | 25 |
| 60 | 12 |
| 90 | 1 |

The solution was stirred for 7 hours at 150° C. The reaction mixture was cooled below 80° C. and diluted with 400 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 471 grams (94.2%).

Preparative Example 6

Poly(Phenylene Ether)-Poly(Hydroxy Ether) Block Copolymer with 80 Weight Percent Poly(Phenylene Ether) Blocks

TABLE 7

| | Reactant Amounts | | | | |
|---|---|---|---|---|---|
| Reactant | HEW[1] (grams/ equiv) | EEW[2] (grams/ equiv) | Amount (grams) | Amount (equiv) | Ratio Epoxy to PPE |
| PPE-2OH 0.09 IV | 778 | — | 150.31 | 0.5116 | 1.000:1 |
| DER 317 | — | 199.3 | 199.3 | 0.5116 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The DER 317 polymer was added in portions over 90 minutes as follows.

| Time (minutes) | Amount Added (Weight %) |
|---|---|
| 0 | 67 |
| 30 | 26 |
| 60 | 6 |
| 90 | 1 |

The solution was stirred for 7 hours at 150° C. The reaction mixture was cooled below 80° C. and diluted with 400 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 466 grams (93.2%).

Preparative Example 7

Poly(Phenylene Ether)-Poly(Hydroxy Ether) Block Copolymer with 46.5 Weight Percent Poly(Phenylene Ether) Blocks

TABLE 8

| | Reactant Amounts | | | | |
|---|---|---|---|---|---|
| Reactant | HEW[1] (grams/ equiv) | EEW[2] (grams/ equiv) | Amount (grams) | Amount (equiv) | Ratio Epoxy to PPE |
| PPE-2OH 0.12 IV | 1691 | — | 123.07 | 0.07278 | 1.000:1 |
| DER 667-E | — | 1744 | 126.93 | 0.07278 | |

[1]Hydroxyl equivalent weight.
[2]Epoxide equivalent weight.

Into a 1 liter three-necked round bottom flask equipped with a mechanical stirrer, thermocouple probe, powder funnel, and heating mantel, was added 250 milliliters cyclohexanone. The cyclohexanone was heated to 150° C. with stirring. The poly(phenylene ether) was added and dissolved. Then 2.5 grams (0.0205 moles) of DMAP was added and dissolved. The DER 667-E polymer was added in portions over 120 minutes as follows.

| Time (minutes) | Amount Added (Weight %) |
|---|---|
| 0 | 85.9 |
| 30 | 8.7 |
| 60 | 5.2 |
| 90 | 0.15 |
| 120 | 0.06 |

The solution was stirred for 7 hours at 150° C. The reaction mixture was cooled below 80° C. and diluted with 200 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 237 grams (94.8%).

Preparative Example 8

Poly(Phenylene Ether)-Poly(Hydroxy Ether) Block Copolymer with 48.6 Weight Percent Poly(Phenylene Ether) Blocks

TABLE 9

| | Reactant Amounts | | | | |
|---|---|---|---|---|---|
| Reactant | HEW[1] (grams/ equiv) | EEW[2] (grams/ equiv) | Amount (grams) | Amount (equiv) | Ratio Epoxy to PPE |
| PPE-2OH 0.06 IV | 627 | — | 121.5116 | 0.1938 | 1.000:1 |
| EPON 1002F | — | 663 | 128.4884 | 0.1938 | |

[1]Hydroxyl equivalent weight.
[2]Epoxide equivalent weight.

Into a 1 liter three-necked round bottom flask equipped with a mechanical stirrer, thermocouple probe, powder funnel, and heating mantel, was added 250 milliliters cyclohexanone. The cyclohexanone was heated to 150° C. with stirring. The hydroxy-bifunctional poly(phenylene ether) was added and dissolved. Then 2.5 grams (0.0205 moles) of DMAP was added and dissolved. The EPON 1002F polymer was added in portions over 120 minutes as follows.

| Time (minutes) | Amount Added (Weight %) |
|---|---|
| 0 | 89.5 |
| 30 | 7 |
| 60 | 3.3 |
| 90 | 0.1 |
| 120 | 0.1 |

The solution was stirred for 7 hours at 150° C. The reaction mixture was cooled below 80° C. and diluted with 200 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 226 grams (90.4%).

Preparative Example 9

Poly(Phenylene Ether)-Poly(Hydroxy Ether) Block Copolymer with 48 Weight Percent Poly(Phenylene Ether) Blocks

TABLE 10

| | Reactant Amounts | | | | |
|---|---|---|---|---|---|
| Reactant | HEW[1] (grams/ equiv) | EEW[2] (grams/ equiv) | Amount (grams) | Amount (equiv) | Ratio Epoxy to PPE |
| PPE-2OH 0.09 IV | 778 | — | 238.60 | 0.3067 | 0.9993:1 |
| EPON 1004F | — | 853 | 261.40 | 0.3065 | |

[1]Hydroxyl equivalent weight.
[2]Epoxide equivalent weight.

Into a 2 liter three-necked round bottom flask equipped with a mechanical stirrer, thermocouple probe, powder funnel, and heating mantel, was added 500 milliliters cyclohexanone. The cyclohexanone was heated to 150° C. with stirring. The poly(phenylene ether) was added and dissolved. Then 5.0 grams (0.0409 moles) of DMAP was added and dissolved. The EPON 1004F polymer was added in portions over 90 minutes as follows.

| Time (minutes) | Amount Added (Weight %) |
|---|---|
| 0 | 77 |
| 30 | 22 |
| 60 | 0.75 |
| 90 | 0.25 |

The solution was stirred for 7 hours at 150° C. The reaction mixture was cooled below 80° C. and diluted with 400 milliliters 2-butanone. The resultant poly(phenylene ether)-poly(hydroxy ether) block copolymer was isolated by precipitation in methanol, filtered, washed with methanol, and dried in a vacuum oven at 100° C. The yield was 471 grams (94%).

Characterization of Poly(Phenylene Ether)-Poly(Hydroxy Ether) Block Copolymers Various properties of the poly(phenylene ether)-poly(hydroxy ether) block copolymers of Preparative Examples 1-9 were determined. Glass transition temperature ($T_g$) was measured by differential scanning calorimetry (DSC) according to ASTM D3418-08. Number average molecular weight ($M_n$), weight average molecular weight ($M_w$), and polydispersity ($M_w/M_n$) were determined by gel permeation chromatography (GPC) using polystyrene standards. Density was measured at 23° C. according to ASTM D792-08. Flexural modulus and flexural stress at break (both expressed in megapascals) were measured at 23° C. according to ASTM D790-10, Method B, using samples having a depth of 3.2 millimeters and a width of 12.7 millimeters, a support span length of 10 centimeters (3.937 inches), and a crosshead motion rate of 1.35 millimeters/minute (0.053 inch/minute). Heat deflection temperature (expressed in degrees Centigrade), was measured according to ASTM D648-07, Method B, using a load of 1.82 megapascals and injection molded specimens having a width of 3.20 millimeters and a depth of 12.80 millimeters. For heat deflection testing, samples were immersed in silicone oil, which was initially at less than 30° C. Specimens were conditioned for 24 hours at 23° C. before testing.

Terminal epoxy group content was determined by proton nuclear magnetic resonance ($^1$H-NMR) spectroscopy using a Varian Mercury Plus 400 Megahertz $^1$H-NMR spectrometer. The amount of terminal epoxy groups was calculated from the height of the peaks corresponding to protons "a" and "h" in the structures below using the equation:

Weight Percent Terminal Epoxy Groups=$h/(h+a)\times 100$.

The proton peak assignments corresponding to the labeled protons in the chemical structures below are given in Table 11.

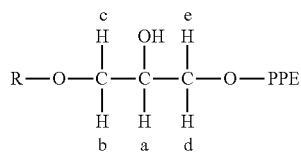

hydroxyether group

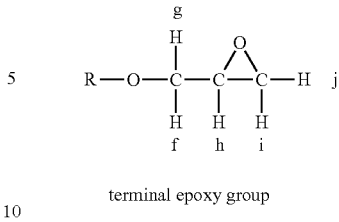

terminal epoxy group

TABLE 11

Proton Chemical Shifts

| Proton | Chemical Shift (parts per million)* |
|---|---|
| a | 4.35 |
| e | 2.74 |
| f | 4.19 |
| g | 3.94 |
| h | 3.34 |
| i | 2.89 |

*Chloroform measured at 7.26 parts per million.

The limit of detection of terminal epoxy groups in this method is <0.05 weight percent. Properties for Preparative Examples 1-8 are summarized in Table 12.

TABLE 12

Chemical and Physical Properties of Poly(phenylene ether)-poly(hydroxy ether) Block Copolymers

| Example | PPE (wt %) | Tg (° C.) | $M_n$ | $M_w$ | $M_n/M_w$ | Epoxy (wt %) | Density (g/cc) | Flex. Modulus (MPa) | Flex. Stress @ Break (MPa) | HDT @ 1.82 MPa (° C.) |
|---|---|---|---|---|---|---|---|---|---|---|
| Prep. Ex. 1 | 24 | 112 | 6456 | 20,720 | 3.21 | <0.05 | — | — | — | — |
| Prep. Ex. 2 | 30 | 117 | 5607 | 24,274 | 4.33 | <0.05 | 1.1565 | 2972 | 89 | 98 |
| Prep. Ex. 3 | 36 | 120 | 6873 | 36,440 | 5.30 | <0.05 | 1.1506 | 2988 | 87 | 101 |
| Prep. Ex. 4 | 54 | 132 | 6527 | 32,698 | 5.01 | <0.05 | 1.1352 | 2905 | 84 | 109 |
| Prep. Ex. 5 | 60 | 141 | 7324 | 41,928 | 5.72 | <0.05 | 1.1291 | 2956 | 80 | 124 |
| Prep. Ex. 6 | 80 | 155 | 6534 | 33,988 | 5.20 | <0.05 | 1.1116 | — | — | — |
| Prep. Ex. 7 | 46.5 | 127 | 6511 | 27,919 | 3.80 | — | — | — | — | — |
| Prep. Ex. 8 | 48.6 | 126 | 5980 | 21,591 | 3.60 | — | — | — | — | — |
| Prep. Ex. 9 | 48 | 125 | 8147 | 30,388 | 3.73 | <0.05 | 1.1408 | — | — | — |

Preparative Example 10

Materials used in compounding experiments are summarized in Table 13.

TABLE 13

| Component | Description |
|---|---|
| EVA | Poly(ethylene-vinyl acetate), CAS Reg. No. 24937-78-8, containing approximately 18 weight percent vinyl acetate comonomer content and having a melt flow rate of about 8 grams/10 minutes measured at 190° C. and 2.16 kilogram load according to ASTM D1238; obtained as ELVAX 450 from DuPont. |
| PBT | Poly(butylene terephthalate), CAS Reg. No. 26062-94-2, having a melt volume-flow rate of about 6 cubic centimeters per 10 minutes measured at 250° C. and 1.2 kilogram load according to ISO 1133; obtained as VALOX 315 from SABIC Innovative Plastics. |
| PLA | Poly(lactic acid) (polylactide), CAS Reg. No. 9051-89-2, having a melt flow rate of about 22 grams/10 minutes measured at 210° C. and 2.16 kilogram load according to ASTM D1238; obtained as INGEO 3001D from NatureWorks LLC. |
| PPE 0.40 IV | Poly(2,6-dimethyl-1,4-phenylene ether), CAS Reg. No. 24938-67-8, having an intrinsic viscosity of about 0.40 deciliter per gram as measured in chloroform at 25° C.; obtained as PPO 640 from SABIC Innovative Plastics. |
| SEBS | Polystyrene-poly(ethylene-butylene)-polystyrene triblock copolymer, CAS Reg. No. 66070-58-4, having a polystyrene content of about 30%; obtained as KRATON G1650M from Kraton Performance Polymers Inc. |
| PPE-PHE 36%, 1500 | Poly(phenylene ether)-poly(hydroxyl ether) block copolymer prepared according to the method of Preparative Example 3, having about 36 weight percent poly(phenylene ether) blocks, a poly(phenylene ether) block molecular weight of about 1500 atomic mass units, and a poly(hydroxyl ether) block molecular weight of about 2730 atomic mass units, and a calculated hydroxyl group content of 3.83 weight percent. |
| PPE-PHE 48%, 1500 | Poly(phenylene ether)-poly(hydroxyl ether) block copolymer prepared according to the method of Preparative Example 9, having about 48 weight percent poly(phenylene ether) blocks, a poly(phenylene ether) block molecular weight of about 1500 atomic mass units, and a poly(hydroxyl ether) block molecular weight of about 1706 atomic mass units, and a calculated hydroxyl group content of 3.11 weight percent. |
| PPE-PHE 60%, 1500 | Poly(phenylene ether)-poly(hydroxyl ether) block copolymer prepared according to the method of Preparative Example 5, having about 60 weight percent poly(phenylene ether) blocks, a poly(phenylene ether) block molecular weight of about 1500 atomic mass units, and a poly(hydroxyl ether) block molecular weight of about 1056 atomic mass units, and a calculated hydroxyl group content of 2.39 weight percent. |
| PPE-PHE 80%, 1500 | Poly(phenylene ether)-poly(hydroxyl ether) block copolymer prepared according to the method of Preparative Example 6, having about 80 weight percent poly(phenylene ether) blocks, a poly(phenylene ether) block molecular weight of about 1500 atomic mass units, and a poly(hydroxyl ether) block molecular weight of about 399 atomic mass units, and a calculated hydroxyl group content of 1.20 weight percent. |
| PPE-PHE 46.5%, 2750 | Poly(phenylene ether)-poly(hydroxyl ether) block copolymer prepared according to the method of Preparative Example 7, having about 46.5 weight percent poly(phenylene ether) blocks, a poly(phenylene ether) block molecular weight of about 2750 atomic mass units, and a poly(hydroxyl ether) block molecular weight of about 3488 atomic mass units, and a calculated hydroxyl group content of 3.20 weight percent. |
| PPE-PHE 48.6%, 1150 | Poly(phenylene ether)-poly(hydroxyl ether) block copolymer prepared according to the method of Preparative Example 8, having about 48.6 weight percent poly(phenylene ether) blocks, a poly(phenylene ether) block molecular weight of about 1150 atomic mass units, and a poly(hydroxyl ether) block molecular weight of about 1326 atomic mass units, and a calculated hydroxyl group content of 3.08 weight percent. |
| PKHH | Phenoxy resin produced by copolymerization of 2,2-bis(4-hydroxyphenyl)propane and 2,2-bis(4-hydroxyphenyl)propane-epichlorohydrin polymer, having a number average molecular weight of 10,000 atomic mass units; obtained as PKHH from InChem Corporation. |
| TBPP | Tris(2,4-di-tert-butylphenyl) phosphite, CAS Reg. No. 31570-04-4; obtained as IRGAFOS 168 from BASF Corp. |
| PHBPP | Pentaerythritoltetrakis(3-(3,5-di-tert-butyl-4-hydroxyphenyl)propionate), CAS Reg. No. 6683-19-8; obtained as IRGANOX 1010 from BASF Corp. |
| $NaH_2PO_4$ | Anhydrous monosodium phosphate, CAS Reg. No. 7558-80-7. |
| PPE/SEBS masterbatch | A masterbatch prepared by melt blending 79.2 weight percent of PPE 0.40 IV, 19.8 weight percent of SEBS, 0.5 weight percent of TBPP, and 0.5 weight percent of TBPP, prepared as described in Preparative Example 10. |
| PBT masterbatch | A masterbatch prepared by melt blending 99.7 weight percent of PBT and 0.3 weight percent of $NaH_2PO_4$, prepared as described in Preparative Example 11. |
| PLA masterbatch | A masterbatch prepared by melt blending 99.7 weight percent of PLA and 0.3 weight percent of $NaH_2PO_4$, prepared as described in Preparative Example 12. |

A masterbatch containing approximately 80 weight percent poly(2,6-dimethyl-1,4-phenylene ether) ("PPE 0.40 IV" in Table 13) and approximately 20 weight percent polystyrene-poly(ethylene-butylene)-polystyrene triblock copolymer ("SEBS" in Table 13) was prepared by compounding 8 kilograms poly(2,6-dimethyl-1,4-phenylene ether), 2 kilograms polystyrene-poly(ethylene-butylene)-polystyrene triblock copolymer, 50 grams tris(2,4-di-tert-butylphenyl) phosphite ("TBPP" in Table 13), and 50 grams of pentaerythritol tetrakis(3-(3,5-di-tert-butyl-4-hydroxyphenyl)propionate) ("PHBPP" in Table 13). The mixture was extruded using a 30 millimeter screw diameter twin-screw Werner & Pfleiderer extruder operating at a screw rotation rate of 325 rotations per minute, a throughput of 48 pounds per hour (21.8 kilograms per hour), 83% torque, and zone temperatures of 240° C., 285° C., 285° C., 280° C., and 280° C., and 285° C. from feed throat to die.

Preparative Example 11

A stabilized poly(butylene terephthalate) was prepared by compounding 2991 grams of poly(butylene terephthalate) ("PBT" in Table 13) with 9 grams (0.3 weight percent) of anhydrous monosodium phosphate on a Coperion ZSK 18 twin-screw laboratory extruder (18 millimeter screw diameter) at a screw rotation rate of 300 rotations per minute, 40% torque, and zone temperatures of 180° C., 230° C., 260° C., 260° C., 260° C., 255° C., and 240° C. from feed throat to die.

Preparative Example 12

A stabilized poly(lactic acid) (polylactide) was prepared by compounding 2991 grams of poly(lactic acid) ("PLA" in Table 13) with 9 grams (0.3 weight percent) of anhydrous monosodium phosphate on a Coperion ZSK 18 twin-screw laboratory extruder (18 millimeter screw diameter) at a screw rotation rate of 300 rotations per minute, 60-75% torque, and zone temperatures of 150° C., 190-200° C., 210-240° C., 240-270° C., 240-270° C., 240-270° C., and 250-280° C. from feed throat to die.

Examples 1-4, Comparative Examples A-C

These examples illustrate the use of poly(phenylene ether)-poly(hydroxy ether) block copolymers as compatibilizing agents for poly(phenylene ether)-poly(butylene terephthalate) compositions.

Compositions were compounded on a Coperion ZSK 18 twin-screw laboratory (18 millimeter screw outer diameter) extruder operating at a screw rotation rate of 300 rotations per minute, a torque of 70-95%, and zone temperatures of 180° C., 230° C., 260° C., 270° C., 270° C., 270° C., and 270° C. from fee throat to die. Articles for physical property testing were injection molded using a Demag Plastic Group Model 40-80 injection molding machine operating at the conditions summarized in Table 14, where the injection pressure values and back pressure values are expressed in units of megapascals.

TABLE 14

Injection Molding Conditions

|  | Zone 1 (° C.) | Zone 2 (° C.) | Zone 3 (° C.) | Nozzle (° C.) | Mold (° C.) | Injection Pressure (MPa) | Back Pressure (MPa) |
|---|---|---|---|---|---|---|---|
| C. Ex. A | 250 | 250 | 250 | 250 | 55 | 9.65 | 0.35 |
| C. Ex. B | 271 | 271 | 271 | 271 | 60 | 9.65 | 0.35 |
| C. Ex. C | 282 | 282 | 282 | 282 | 60 | 10.34 | 0.35 |
| Ex. 1 | 271 | 271 | 271 | 271 | 60 | 9.65 | 0.35 |
| Ex. 2 | 271 | 271 | 271 | 271 | 60 | 9.65 | 0.35 |
| Ex. 3 | 271 | 271 | 271 | 271 | 60 | 9.65 | 0.35 |
| Ex. 4 | 271 | 271 | 271 | 271 | 60 | 9.65 | 0.35 |

Poly(butylene terephthalate)-containing compositions and their properties are summarized in Table 15, where component amounts are expressed in units of parts by weight based on the total weight of the composition. In Table 15, the amount values associated with "PBT (derived from PBT masterbatch)" are amounts of poly(butylene terephthalate) (not amounts of PBT masterbatch). Similarly, in Table 15, the amount values associated with "PPE (derived from PPE/SEBS masterbatch)" are amounts of poly(phenylene ether) (not amounts of PPE/SEBS masterbatch). Density values, expressed in units of grams per cubic centimeter, were determined according to ASTM D 792-08 at 23° C. Notched Izod values, expressed in units of joules per meter, were determined according to ASTM D256-08, Method A, at a temperature of 23° C., a hammer energy of 2 foot-pounds (2.711 joules), and bar dimensions of 3.2 millimeters by 12.7 millimeters by 0.20 millimeters. Heat deflection temperature was measured according to ASTM D648-07 using an edgewise test direction, cross-sectional dimensions of 3.2 millimeters by 12.5 millimeters, a load of 1.82 megapascals, and no annealing before testing. The results in Table 15 show that Examples 1-4, containing a poly(phenylene ether)-poly(hydroxy ether) block copolymer, exhibit substantially greater toughness (as evidenced by notched Izod impact strength) and heat resistance (as evidenced by heat deflection temperature) than Comparative Example C, containing a poly(hydroxy ether).

Density values, expressed in units of grams per cubic centimeter, were determined according to ASTM D 792-08 at 23° C. Notched Izod values, expressed in units of joules per meter, were determined according to ASTM D256-08, Method A, at a temperature of 23° C., a hammer energy of 2 foot-pounds (2.711 joules), and bar dimensions of 3.2 millimeters by 12.7 millimeters by 0.20 millimeters. Heat deflection temperature was measured according to ASTM D648-07 using an edgewise test direction, cross-sectional dimensions of 3.2 millimeters by 12.5 millimeters, a load of 1.82 megapascals, and no annealing before testing. The results in Table 15 show that Examples 1-4, containing a poly(phenylene ether)-poly(hydroxy ether) block copolymer, exhibit substantially greater toughness (as evidenced by notched Izod impact strength) and heat resistance (as evidenced by heat deflection temperature) than Comparative Example C, containing a poly(hydroxy ether).

TABLE 15

|  | C. Ex A | C. Ex. B | C. Ex. C | Ex. 1 | Ex. 2 | Ex.3 | Ex. 4 |
|---|---|---|---|---|---|---|---|
| COMPOSITIONS | | | | | | | |
| PBT masterbatch | 100 | 40 | 40 | 40 | 40 | 40 | 40 |
| PPE/SEBS masterbatch | 0 | 60 | 50 | 50 | 50 | 50 | 50 |
| PKHH | 0 | 0 | 10 | 0 | 0 | 0 | 0 |
| PPE-PHE 36%, 1500 | 0 | 0 | 0 | 10 | 0 | 0 | 0 |
| PPE-PHE 48%, 1500 | 0 | 0 | 0 | 0 | 10 | 0 | 0 |
| PPE-PHE 60%, 1500 | 0 | 0 | 0 | 0 | 0 | 10 | 0 |
| PPE-PHE 46.5%, 2750 | 0 | 0 | 0 | 0 | 0 | 0 | 10 |
| PROPERTIES | | | | | | | |
| Density (g/cm$^3$) | 1.341 | 1.132 | 1.145 | 1.147 | 1.146 | 1.144 | 1.145 |
| Notched Izod (J/m) | 48.7 | 13.2 | 11.5 | 152.3 | 132.4 | 96.3 | 177.3 |
| HDT @ 1.82 MPa (° C.) | 54 | 89 | 62 | 91 | 95 | 105 | 92 |

Figure 2:
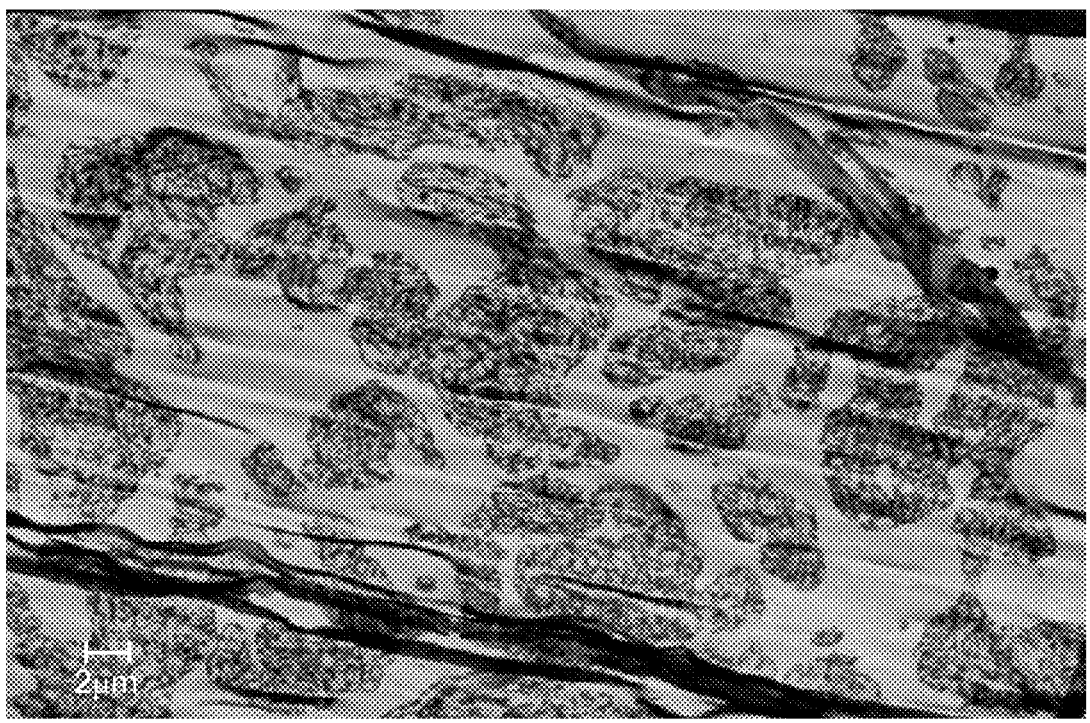
FIG. 2 is a scanning transmission electron micrograph of a stained surface of the Comparative Example C composition exhibiting relatively large disperse phase domains.
Figure 3:
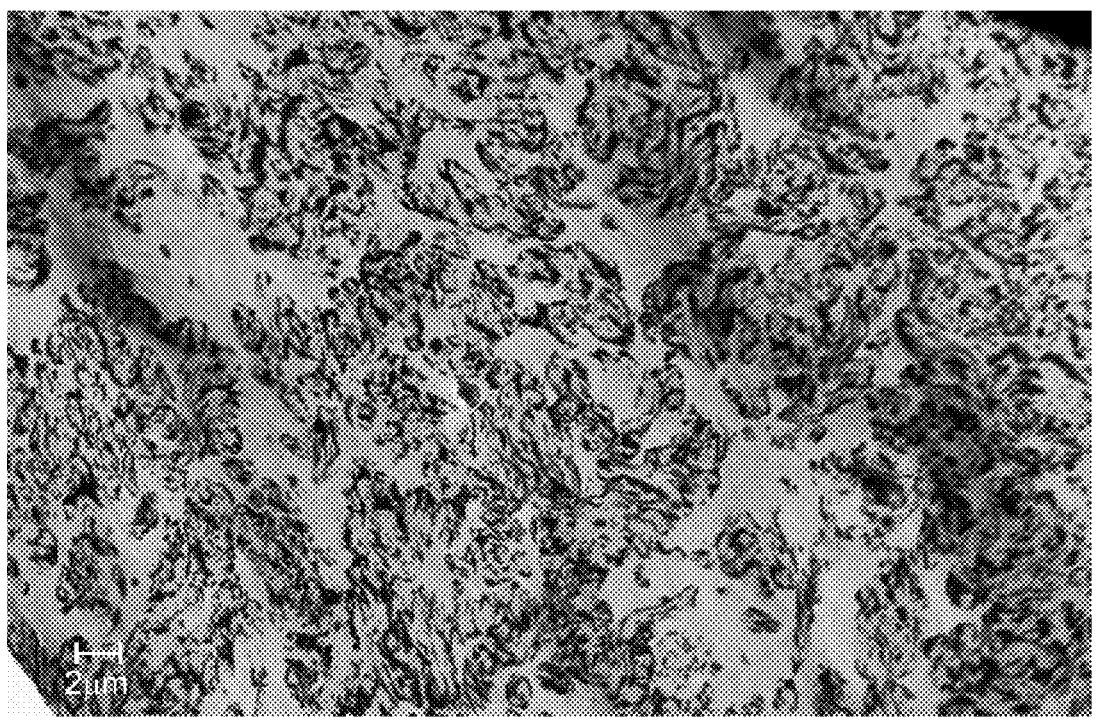
FIG. 3 is a scanning transmission electron micrograph of a stained surface of the Example 1 composition exhibiting relatively small disperse phase domains.
Figure 4:
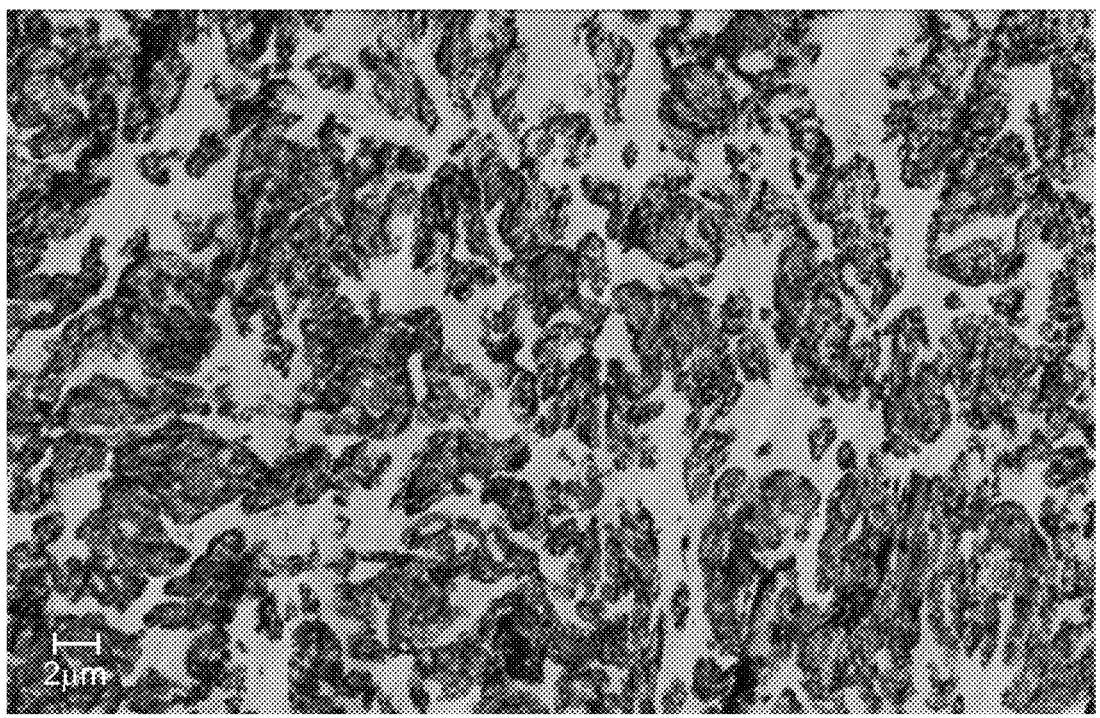
FIG. 4 is a scanning transmission electron micrograph of a stained surface of the Example 4 composition exhibiting relatively small disperse phase domains.

The morphology of the Comparative Example B, Comparative Example C, Example 1, and Example 4 were investigated by scanning transmission electron microscopy. Microtomed surfaces were stained with osmium tetroxide and ruthenium tetroxide and observed with a Zeiss EVO40 XVP scanning electron microscope with scanning transmission electron microscopy module. Representative micrographs for Comparative Example B, Comparative Example C, Example 1, and Example 4 are presented as FIGS. 1-4, respectively. The micrographs for Comparative Example B (FIG. 1) and Comparative Example C (FIG. 2) show very large poly(phenylene ether)/polystyrene-poly(ethylene-butylene)-polystyrene disperse phase domains. In contrast, the micrographs for Example 1 (FIG. 3) and Example 4 (FIG. 4) show significantly smaller, well-dispersed poly(phenylene ether)/polystyrene-poly(ethylene-butylene)-polystyrene disperse phase domains.

Examples 5 and 6, Comparative Examples D and E

These examples illustrate the use of poly(phenylene ether)-poly(hydroxy ether) block copolymers as compatibilizing agents for PPE and EVA. Compositions were compounded and molded as described for Examples 1-4. The compounding conditions are summarized in Table 16, where "Screw Rot. Rate (rpm)" is the extruder screw rotation rate, expressed in units of rotations per minute.

TABLE 16

| | Zone 1 (° C.) | Zone 2 (° C.) | Zone 3 (° C.) | Zone 4 (° C.) | Zone 5 (° C.) | Zone 6 (° C.) | Die (° C.) | Screw Rot. Rate (rpm) | Torque (%) |
|---|---|---|---|---|---|---|---|---|---|
| C. Ex. D | 190 | 240 | 240 | 260 | 260 | 270 | 270 | 275 | 45 |
| C. Ex. E | 150 | 190 | 230 | 260 | 260 | 260 | 270 | 275 | 50 |
| Ex. 5 | 150 | 190 | 230 | 260 | 260 | 260 | 270 | 275 | 60 |
| Ex. 6 | 150 | 190 | 230 | 260 | 260 | 260 | 270 | 275 | 60 |

Articles for physical property testing were injection molded using a Demag Plastic Group Model 40-80 injection molding machine operating at the conditions summarized in Table 17.

Table 17

| | Zone 1 (° C.) | Zone 2 (° C.) | Zone 3 (° C.) | Nozzle (° C.) | Mold (° C.) | Injection Pressure (MPa) | Back Pressure (MPa) |
|---|---|---|---|---|---|---|---|
| C. Ex. D | 216 | 216 | 216 | 216 | 49 | 12.4 | 0.34 |
| C. Ex. E | 216 | 216 | 216 | 216 | 49 | 11.7 | 0.34 |
| Ex. 5 | 216 | 216 | 216 | 216 | 49 | 11.7 | 0.34 |
| Ex. 6 | 216 | 216 | 216 | 216 | 49 | 13.1 | 0.34 |

Compositions and properties are summarized in Table 18. Values for flexural stress at 5% strain, expressed in units of megapascals, were determined according to ASTM D790-07e1, Procedure A, using a temperature of 23° C., bar cross-sectional dimensions of 3.2 millimeters by 12.7 millimeters, a support span of 50.8 millimeters, and a test speed of 1.27 millimeters/minute (0.05 inches/minute). Values for Vicat softening temperature, expressed in degrees centigrade, were determined according to ASTM D1525-07 using a loading of 10 newtons, a heating rate of 50 degrees centigrade per hour, a needle penetration at reading of 1 millimeter, a pre-loading time of 5 minutes, and three specimens per reported value. The property results in Table 18 show that Examples 5 and 6 containing a poly(phenylene ether)-poly(hydroxy ether) block copolymer exhibit greater stiffness (as evidenced by flexural properties), and heat resistance (as evidenced by VICAT softening temperature), than Comparative Example D containing no compatibilizer, and Comparative Example E containing a poly(hydroxy ether).

TABLE 18

| | C. Ex. D | C. Ex. E | Ex. 5 | Ex. 6 |
|---|---|---|---|---|
| COMPOSITIONS | | | | |
| EVA | 40 | 40 | 40 | 40 |
| PPE/SEBS masterbatch | 60 | 50 | 50 | 50 |

TABLE 18-continued

| | C. Ex. D | C. Ex. E | Ex. 5 | Ex. 6 |
|---|---|---|---|---|
| PKHH | 0 | 10 | 0 | 0 |
| PPE-PHE 60%, 1500 | 0 | 0 | 10 | 0 |
| PPE-PHE 80%, 1500 | 0 | 0 | 0 | 10 |
| PROPERTIES | | | | |
| Flexural Modulus (MPa) | 111.3 | 148.1 | 180.7 | 134.7 |
| Flexural Stress @ 5% strain (MPa) | 5.4 | 7.2 | 7.9 | 6.0 |
| Vicat Softening Temp. (° C.) | 65.7 | 64.4 | 69.3 | 67.5 |

Examples 7 and 8, Comparative Examples F and G

These examples illustrate the use of poly(phenylene ether)-poly(hydroxy ether) block copolymers as compatibilizing agents for poly(lactic acid) and poly(phenylene ether). Compositions were compounded and molded as described for Examples 1-4. The compounding conditions are summarized in Table 19.

TABLE 19

| | Zone 1 (° C.) | Zone 2 (° C.) | Zone 3 (° C.) | Zone 4 (° C.) | Zone 5 (° C.) | Zone 6 (° C.) | Die (° C.) | Screw Rot. Rate (rpm) | Torque (%) |
|---|---|---|---|---|---|---|---|---|---|
| C. Ex. F | 190 | 240 | 240 | 260 | 260 | 270 | 270 | 275 | 45 |
| C. Ex. G | 150 | 190 | 230 | 260 | 260 | 260 | 270 | 275 | 50 |

TABLE 19-continued

| | Zone 1 (° C.) | Zone 2 (° C.) | Zone 3 (° C.) | Zone 4 (° C.) | Zone 5 (° C.) | Zone 6 (° C.) | Die (° C.) | Screw Rot. Rate (rpm) | Torque (%) |
|---|---|---|---|---|---|---|---|---|---|
| Lx. 7 | 150 | 190 | 230 | 260 | 260 | 260 | 270 | 275 | 60 |
| Ex. 8 | 150 | 190 | 230 | 260 | 260 | 260 | 270 | 275 | 60 |

Articles for physical property testing were injection molded using a Demag Plastic Group Model 40-80 injection molding machine operating at the conditions summarized in Table 20.

TABLE 20

| | Zone 1 (° C.) | Zone 2 (° C.) | Zone 3 (° C.) | Nozzle (° C.) | Mold (° C.) | Injection Pressure (MPa) | Back Pressure (MPa) |
|---|---|---|---|---|---|---|---|
| C. Ex. F | 254 | 254 | 254 | 254 | 49 | 12.4 | 0.34 |
| C. Ex. G | 271 | 271 | 271 | 271 | 49 | 8.3 | 0.34 |
| Ex. 7 | 243 | 243 | 243 | 243 | 49 | 14.5 | 0.34 |
| Ex. 8 | 243 | 243 | 243 | 243 | 49 | 13.8 | 0.34 |

Compositions and properties are summarized in Table 21, where values of tensile modulus and tensile stress at break, both expressed in units of megapascals, were determined at 23° C. according to ASTM D638-08 at 23° C. using a Type I bar, a gage length of 50 millimeters, and a test speed of 50 millimeters/minute. The property results in Table 21 show that Examples 7 and 8 containing a poly(phenylene ether)-poly(hydroxy ether) block copolymer exhibit substantially greater stiffness (as evidenced by flexural and tensile modulus properties), and toughness (as evidenced by notched Izod impact strength and tensile stress at break), than Comparative Example F containing no compatibilizer, and Comparative Example G containing a poly(hydroxy ether).

TABLE 21

|  | C. Ex. F | C. Ex. G | Ex. 7 | Ex. 8 |
|---|---|---|---|---|
| COMPOSITIONS | | | | |
| PLA masterbatch | 40 | 40 | 40 | 40 |
| PPE/SEBS masterbatch | 60 | 50 | 50 | 50 |
| PKHH | 0 | 10 | 0 | 0 |
| PPE-PHE 60%, 1500 | 0 | 0 | 10 | 0 |
| PPE-PHE 80%, 1500 | 0 | 0 | 0 | 10 |
| PROPERTIES | | | | |
| Flexural Modulus (MPa) | 1818 | 1963 | 2198.5 | 2147 |
| Flexural Stress @ Break (MPa) | 46.1 | 47.8 | 52.0 | 48.4 |
| HDT @ 1.82 MPa (° C.) | 71.3 | 71.4 | 73.2 | 73.3 |
| Notched Izod (J/m) | 15.4 | 10.2 | 31.6 | 22.4 |
| Tensile Modulus (MPa) | 1594 | 1628 | 1896 | 1889 |
| Tensile Stress @ Break (MPa) | 27.2 | 29.0 | 40.2 | 36.6 |

Examples 9-12, Comparative Examples H and I

These examples illustrate the melt flow advantages of the present compositions relative to polymer blends with epoxy-functionalized compatibilizing agents.

W.-B. Liu, W.-F. Kuo, C.-J. Chiang, F.-C. Chang, *European Polymer Journal*, volume 32, pages 91-99 (1996) teaches the use of a styrene-glycidyl methacrylate copolymer (SGM) as a reactive compatibilizing agent for blends of poly (butylene terephthalate) (PBT) and poly(phenylene ether) (PPE). The styrene-glycidyl methacrylate copolymer works by reaction of the glycidyl groups (epoxy) on with end groups on PBT and PPE. The reaction of SGM with one or more PBT and PPE molecules would give a higher molecular weight reaction product. As demonstrated in the reference, addition of the epoxy-functionalized compatibilizer SGM substantially reduces the melt flow of the poly(butylene terephthalate)/poly(phenylene ether) blends.

The effect of poly(phenylene ether)-poly(hydroxy ether) block copolymer compatibilization on melt flow of poly(butylene terephthalate)/poly(phenylene ether) blends is demonstrated in Table 22, which summarizes melt flow results for two comparative examples and four inventive examples varying in the type and amount of block copolymer compatibilizer.

Melt flow rates, expressed in units of grams per 10 minutes, were measured according to ASTM D1238-04 using Procedure B (automatically timed), a temperature of 280° C., an applied load of 3.8 kilograms, a capillary diameter of 2.0955 millimeters, a capillary length of 8 millimeters, and test material pellets that had been dried for three hours at 125° C. prior to testing.

In Table 22, component amounts are expressed in weight percent, based on the total weight of the composition. Comparative Examples Q and R are the same as Comparative Examples B and C, described above, and Examples 9-12 are the same as Examples 1-4, respectively. The results in Table 22 show that use of a poly(phenylene ether)-poly(hydroxy ether) block copolymer in the four inventive samples substantially increases their melt flow.

TABLE 22

|  | C. Ex. Q | C. Ex. R | Ex. 9 | Ex. 10 | Ex. 11 | Ex. 12 |
|---|---|---|---|---|---|---|
| COMPOSITIONS | | | | | | |
| PBT masterbatch | 40 | 40 | 40 | 40 | 40 | 40 |
| PPE/SEBS masterbatch | 60 | 50 | 50 | 50 | 50 | 50 |
| PKHH | 0 | 10 | 0 | 0 | 0 | 0 |
| PPE-PHE 36%, 1500 | 0 | 0 | 10 | 0 | 0 | 0 |
| PPE-PHE 48%, 1500 | 0 | 0 | 0 | 10 | 0 | 0 |
| PPE-PHE 60%, 1500 | 0 | 0 | 0 | 0 | 10 | 0 |
| PPE-PHE 46.5%, 2750 | 0 | 0 | 0 | 0 | 0 | 10 |
| PROPERTIES | | | | | | |
| Melt flow rate (g/10 min) | 12.7 | 20.8 | 15.2 | 25.2 | 19.6 | 16.1 |
| Change in melt flow rate (%) | — | +64.3 | +19.7 | +99.1 | +55.1 | +26.9 |

D.-W Lo, C.-R. Chiang, and F.-C. Chang, *Journal of Applied Polymer Science*, volume 65, pages 739-753 (1997), teaches the use of the tetrafunctional epoxy resin, tetraglycidyl-4,4'-diaminodiphenylmethane (TGDDM), as a reactive compatibilizing agent for blends of poly(ethylene terephthalate) (PET) and poly(phenylene ether) (PPE). TGDDM works by reacting with end groups on PET and PPE. The reaction of TGDDM with one or more PET and PPE molecules would give a much higher molecular weight reaction product. As demonstrated in the reference, addition of the epoxy-functionalized compatibilizer TGDDM substantially reduces the melt flow of the poly(ethylene terephthalate)/poly(phenylene ether) blends.

The invention claimed is:

1. A composition comprising:
   30 to 93 weight percent of a polar polymer selected from the group consisting of cellulose esters, poly(alkyl (meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, poly(vinyl butyral)s, and combinations thereof;
   5 to 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; and 2 to 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1;

wherein all weight percents are based on the total weight of the composition, unless a different weight basis is specified.

2. The composition of claim 1, wherein the poly(phenylene ether)-poly(hydroxy ether) block copolymer has a number average molecular weight of 5,000 to 50,000 atomic mass units.

3. The composition of claim 1,
wherein the at least one poly(phenylene ether) block has the structure

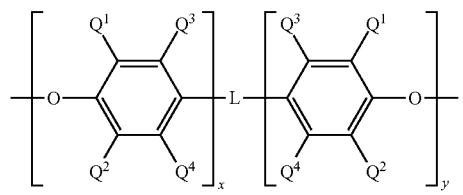

wherein $Q^1$ and $Q^2$ are selected from the group consisting of halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to 30, with the proviso that the sum of x and y is at least 2; and L has the structure

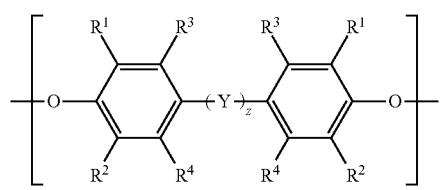

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

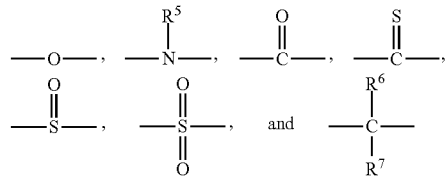

wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group; and wherein the at least one poly(hydroxy ether) block has the structure

wherein A is a residue of structure

wherein each $G^1$ is independently at each occurrence a $C_6$-$C_{20}$ aromatic radical, and E is independently at each occurrence a direct bond, or a structure selected from the group consisting of

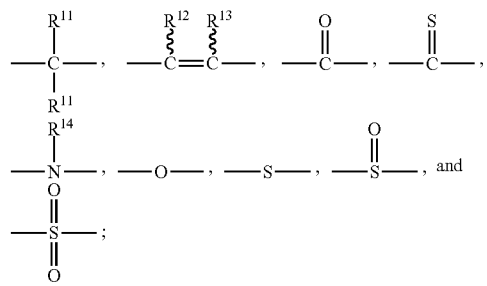

wherein each occurrence of $R^{11}$-$R^{14}$ is independently hydrogen or $C_1$-$C_{12}$ hydrocarbyl, s is 0 or 1, and t and u are each independently 1 to 10; and wherein B is a residue of structure

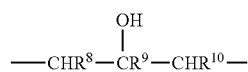

wherein $R^8$ to $R^{10}$ are each independently hydrogen, or $C_1$-$C_{12}$ hydrocarbyl; and wherein n is 1 to 60.

4. The composition of claim 1,
wherein the at least one poly(phenylene ether) block has the structure

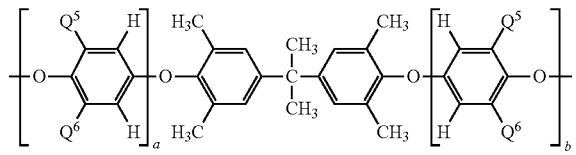

wherein each occurrence of $Q^5$ and $Q^6$ is independently methyl, di-n-butylaminomethyl, or morpholinomethyl; and each occurrence of a and b is independently 0 to 20, provided that the sum of a and b is at least 2; and wherein the at least one poly(hydroxy ether) block has the structure

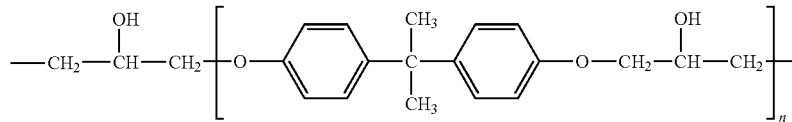

wherein n is 1 to 60.

5. The composition of any of claims 1-4, wherein the non-polar polymer comprises the poly(phenylene ether).

6. The composition of any of claims 1-4, wherein the non-polar polymer comprises the poly(phenylene ether) and the poly(alkenyl aromatic); and wherein the poly(alkenyl aromatic) is selected from the group consisting of polystyrenes, rubber-modified polystyrenes, and combinations thereof.

7. The composition of any of claims 1-4, wherein the non-polar polymer comprises the poly(phenylene ether) and the hydrogenated block copolymer.

8. The composition of any of claims 1-4, wherein the polar polymer comprises the polyester; and wherein the polyester is selected from the group consisting of poly(ethylene terephthalate)s, poly(trimethylene terephthalate)s, poly(butylene terephthalate)s, polycaprolactones, poly(lactic acid)s, poly(butylene adipate)s, poly(butylene succinate)s, poly(butylene sebacate)s, and combinations thereof.

9. The composition of any of claims 1-4, wherein the polar polymer comprises the polyester; wherein the polyester comprises a poly(butylene terephthalate); and wherein the non-polar polymer comprises the poly(phenylene ether) and the hydrogenated block copolymer.

10. The composition of any of claims 1-4, wherein the polar polymer comprises the polyester; wherein the polyester comprises a poly(lactic acid); and wherein the non-polar polymer comprises the poly(phenylene ether) and the hydrogenated block copolymer.

11. The composition of any of claims 1-4, wherein the polar polymer comprises the poly(ethylene-vinyl acetate); and wherein the non-polar polymer comprises
the poly(phenylene ether), and
the unhydrogenated block copolymer, the hydrogenated block copolymer, or the combination thereof.

12. The composition of claim 11, wherein the poly(ethylene-vinyl acetate) comprises 8 to 60 weight percent vinyl acetate residue.

13. An injection molded article comprising the composition of any of claims 1-4.

14. A method of forming a composition, comprising
melt blending
30 to 93 weight percent of a polar polymer selected from the group consisting of poly(alkyl (meth)acrylate)s, polyamides, polycarbonates, polyesters, polyetherimides, polysulfones, polyethersulfones, poly(ethylene-ethyl acrylate)s, poly(ethylene-vinyl acetate)s, polyurethanes, poly(vinyl acetate)s, poly(vinyl alcohol)s, poly(styrene-acrylonitrile)s, poly(styrene-maleic anhydride)s, and combinations thereof;
5 to 68 weight percent of a non-polar polymer selected from the group consisting of unhydrogenated block copolymers of alkenyl aromatic compounds and conjugated dienes, hydrogenated block copolymers of alkenyl aromatic compounds and conjugated dienes, poly(alkenyl aromatic)s, poly(phenylene ether)s, and combinations thereof; and
2 to 20 weight percent of a poly(phenylene ether)-poly(hydroxy ether) block copolymer comprising at least one poly(hydroxy ether) block, and at least one poly(phenylene ether) block; wherein the mole ratio of poly(hydroxy ether) blocks to poly(phenylene ether) blocks is 0.95:1 to 1.00:1
to form the composition;
wherein all weight percents are based on the total weight of the composition, unless a different weight basis is specified.

* * * * *